US010172112B2

(12) United States Patent
Diachina et al.

(10) Patent No.: US 10,172,112 B2
(45) Date of Patent: *Jan. 1, 2019

(54) CORE NETWORK NODE AND METHOD—TIME COORDINATED CELLS FOR EXTENDED DISCONTINUOUS RECEIVE (EDRX)

(71) Applicant: TELEFONAKTIEBOLAGET LM ERICSSON (PUBL), Stockholm (SE)

(72) Inventors: John Walter Diachina, Garner, NC (US); Paul Schliwa-Bertling, Ljungsbro (SE); Nicklas Johansson, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,708

(22) Filed: May 13, 2016

(65) Prior Publication Data

US 2016/0345293 A1 Nov. 24, 2016

Related U.S. Application Data

(60) Provisional application No. 62/163,794, filed on May 19, 2015.

(51) Int. Cl.
*G08C 17/00* (2006.01)
*H04W 68/02* (2009.01)
(Continued)

(52) U.S. Cl.
CPC ........... *H04W 68/02* (2013.01); *H04L 1/1812* (2013.01); *H04L 61/6054* (2013.01); *H04L 69/28* (2013.01); *H04W 4/70* (2018.02); *H04W 40/005* (2013.01); *H04W 52/0209* (2013.01); *H04W 76/28* (2018.02); *H04W 88/02* (2013.01); *H04W 88/08* (2013.01); *H04W 88/14* (2013.01); *Y02D 70/00* (2018.01); *Y02D 70/1224* (2018.01);
(Continued)

(58) Field of Classification Search
CPC ... H04W 68/02; H04W 4/005; H04W 76/048; H04W 40/005; H04W 52/0209; H04W 88/14; H04W 88/08; H04W 88/02; H04L 1/1812; H04L 61/6054; H04L 69/28; Y02B 60/50
USPC ........................................................ 370/311
See application file for complete search history.

(56) References Cited

U.S. PATENT DOCUMENTS

2005/0002407 A1  1/2005 Shaheen et al.
2006/0262742 A1  11/2006 Dommaraju et al.
(Continued)

OTHER PUBLICATIONS

3GPP TR 23.770 V0.2.0 (Mar. 2015), 3rd Generation Partnership Project; Technical Specification Group Services and System Aspects; Study on System Impacts of Extended DRX Cycle for Power Consumption Optimization; (Release 13), pp. 1-33, p. 8, line 2-p. 11, line 3.

(Continued)

*Primary Examiner* — Mang Hang Yeung

(57) ABSTRACT

A core network node (e.g., Serving GPRS Support Node (SGSN)), a radio access network node (e.g., Base Station Subsystem), and various methods are described herein for realizing time coordinated cells and maintaining a reliability of paging a wireless device (e.g., Machine Type Communications (MTC) device, mobile station).

18 Claims, 9 Drawing Sheets

(51) Int. Cl.
| | | |
|---|---|---|
| *H04L 1/18* | (2006.01) | |
| *H04W 40/00* | (2009.01) | |
| *H04W 52/02* | (2009.01) | |
| *H04L 29/12* | (2006.01) | |
| *H04L 29/06* | (2006.01) | |
| *H04W 4/70* | (2018.01) | |
| *H04W 76/28* | (2018.01) | |
| *H04W 88/14* | (2009.01) | |
| *H04W 88/08* | (2009.01) | |
| *H04W 88/02* | (2009.01) | |

(52) U.S. Cl.
CPC ...... *Y02D 70/1226* (2018.01); *Y02D 70/1262* (2018.01); *Y02D 70/146* (2018.01); *Y02D 70/164* (2018.01); *Y02D 70/21* (2018.01); *Y02D 70/24* (2018.01)

(56) References Cited

U.S. PATENT DOCUMENTS

| | | |
|---|---|---|
| 2010/0130237 A1 | 5/2010 | Kitazoe et al. |
| 2010/0150114 A1 | 6/2010 | Che |
| 2013/0301501 A1 | 11/2013 | Olvera-Hernandez et al. |
| 2014/0016614 A1 | 1/2014 | Velev et al. |
| 2014/0341140 A1 | 11/2014 | Beale |
| 2016/0081022 A1 | 3/2016 | Haneji et al. |
| 2016/0135124 A1 | 5/2016 | Vos et al. |
| 2016/0286385 A1* | 9/2016 | Ryu ............... H04W 68/02 |
| 2016/0295504 A1* | 10/2016 | Wang ............... H04W 52/02 |
| 2016/0330791 A1* | 11/2016 | Vajapeyam ......... H04W 76/048 |
| 2017/0367044 A1 | 12/2017 | Fujishiro et al. |

OTHER PUBLICATIONS

Intel Corporation: "Impacts of Unsynchronized Cells in a Routing Area on Paging with eDRX", 3GPP TSG GERAN Meeting #66, GP-150404, Vilnius, Lithuania, May 25-29, 2015, the whole document.
Ericsson LM, "Pseudo CR 45.820 Synchronized Cells for eDRX", 3GPP DRAFT; GPC150264, 3GPP TSG GERAN Fs_IoT_LC Adhoc#2, Sophia Antipolis, Apr. 20-23, 2015, the whole document.
Ericsson LM, "Time Coordinated Cells for eDRX", 3GPP TSG GERAN #66, Tdoc GP-150426; Agenda item 7.1.5.3.4, 7.1.5.3.5, 7.2.5.3.3, 7.2.5.3.4; Vilnius, Lithuania; May 25-29, 2015; the whole document.
Ericsson LM, "pCR TR 45.820—EC-GSM, Time Coordinated Cells for eDRX", 3GPP TSG GERAN#66, Tdoc GP-150427; Agenda item 7.1.5.3.5, 7.2.5.3.4; Vilnius, Lithuania, May 25-May 29, 2015; the whole document.
Ericsson LM, "pCR TR 43.869—uPoD—Time Coordinated Cells for eDRX", 3GPP TSG Geran#66, TDOC GP-150428; Agenda item 7.1.5.3.4, 7.2.5.3.3; Vilnius, Lithuania; May 25-May 29, 2015; the whole document.
3GPP TS 36.331 V12.5.0 (Mar. 2015), 3rd Generation Partnership Project; Technical Specification Group Radio Access Network; Evolved Universal Terrestrial Radio Access (E-UTRA); Radio Resource Control (RRC); Protocol specification (Release 12), available Mar. 28, 2015, the whole document.
3GPP TS 45.002 V12.4.0 (Mar. 2015), 3rd Generation Partnership Project; Technical Specification Group GSM/EDGE Radio Access Network; Multiplexing and multiple access on the radio path (Release 12), available Mar. 21, 2015, the whole document.
3GPP TS 25.304 V12.5.0 (Mar. 2015), 3rd Generation Partnership Project; Technical Specification Group Radio Access Network; User Equipment (UE) procedures in idle mode and procedures for cell reselection in connected mode (Release 12), available Mar. 23, 2015, the whole document.
Ericsson, "EC-GSM—Paging Group Determination", 3GPP TSG GERAN #65, TDOC GP—150133, Agenda item 7.1.5.3.5, 7.2.5.3. 4; Shanghai, China; Mar. 9-13, 2015; the whole document.
Ericsson LM, "Pseudo CR 45.820—EC-GSM, Paging Group Determination", 3GPP TSG GERAN#65, GP-150259, Agenda item 7.1. 5.3.5, 7.2.5.3.4; Shanghai, P.R. China; Mar. 9-13, 2015; the whole document.
3GPP TS 45.010 V12.0.0 (Sep. 2014), 3rd Generation Partnership Project; Technical Specification Group GSM/EDGE Radio Access Network; Radio subsystem synchronization (Release 12), the whole document.
3GPP TS 48.018 V12.4.0 (Nov. 2014), 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12), the whole document.
Ericsson: "GSM Evolution for cellular IoT—PCH Overview". 3GPP TSG Geran#63. Tdoc GP-140605. Ljubljana, Slovenia. Aug. 25-29, Aug, 2014, the whole document.
Ericsson: "pCR for uPoD eDRX". 3GPP TSG Geran#64. Tdoc GP-140897. San Francisco, USA. Nov. 17-21, 2014, the whole document.
Ericsson: "MS Energy Consumption Evaluation, PSM vs. eDRX". 3GPP TSG Geran#64. Tdoc GP-140910. San Francisco, USA. Nov. 17-21, 2014, the whole document.
3GPP TR 23.709 V0.2.0 (Nov. 2014), 3rd Generation Partnership Project; Technical Specification Group Services and System Aspects; Study on Optimizations to Support High Latency Communications; Stage 2 (Release 13), red-marked version, available Dec. 4, 2014, paragraph [04.1], paragraph [05.2].
Qualcomm Incorporated: "Solution for Buffering downlink data in S-GW for UEs not immediately reachable", SA WG2 Temporary Document, SA WG2 Meeting #S2-106, S2-144170, (revision of S2-14xxxx), Nov. 17-21, 2014, San Francisco, USA, the whole document.
Alcatel-Lucent et al: "HLCOM Solution based on DL buffering in SGW", SA WG2 Temporary Document, SA WG2 Meeting #106, S2-144597, (revision of S2-144385 ), Nov. 17-21, 2014, San Francisco, California, USA, the whole document.
Alcatel-Lucent et al: "HLCOM Solution based on DL buffering in SGW", 3GPP draft; SA WG2 Meeting #106, S2-144385, merge of S2-144112, S2-143939 & S2-144170, Nov. 17-21, 2014, San Francisco, California, USA, the whole document.

* cited by examiner

CORE NETWORK NODE AND METHOD—TIME COORDINATED CELLS FOR EXTENDED DISCONTINUOUS RECEIVE (EDRX)

CLAIM OF PRIORITY

This application claims the benefit of priority to U.S. Provisional Application Ser. No. 62/163,794, filed on May 19, 2015, the entire contents of which are hereby incorporated herein by reference for all purposes.

RELATED PATENT APPLICATION

This application is related to the following co-filed application: U.S. application Ser. No. 15/154,724 entitled "Radio Access Network Node and Method-Time Coordinated Cells for Extended Discontinuous Receive (eDRX)"The entire contents of this document are hereby incorporated herein by reference for all purposes.

TECHNICAL FIELD

The present disclosure relates generally to the wireless communications field and, more particularly, to a core network node (e.g., Serving GPRS Support Node (SGSN)), a radio access network node (e.g., Base Station Subsystem), and various methods for realizing time coordinated cells and maintaining a reliability of paging a wireless device (e.g., Machine Type Communications (MTC) device, mobile station).

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BLER Block Error Rate
BLKS Blocks
BSS Base Station Subsystem
BSSGP Base Station Subsystem General Packet Radio Service Protocol
CC Coverage Class
CN Core Network
DRX Discontinuous Receive Cycle
EC-GSM Extended Coverage Global System for Mobile Communications
EC-PCH Extended Coverage Paging Channel
eDRX Extended Discontinuous Receive
eNB Evolved Node B
DL Downlink
DSP Digital Signal Processor
EDGE Enhanced Data rates for GSM Evolution
EGPRS Enhanced General Packet Radio Service
FN Frame Number
GSM Global System for Mobile Communications
GERAN GSM/EDGE Radio Access Network
GPRS General Packet Radio Service
GPS Global Positioning System
HARQ Hybrid Automatic Repeat Request
IMSI International Mobile Subscriber Identity
IoT Internet of Things
LLC Link Layer Control
LTE Long-Term Evolution
MCS Modulation and Coding Scheme
MF Multiframe
MFRM Multiframe
MFRMS Multiframes
MME Mobility Management Entity
MS Mobile Station
MTC Machine Type Communications
NB Node B
N-PDU Network Protocol Data Unit
PCH Paging Channel
PDN Packet Data Network
PDTCH Packet Data Traffic Channel
PDU Protocol Data Unit
P-TMSI Packet Temporary Mobile Subscriber Identity
RACH Random Access Channel
RAN Radio Access Network
RAT Radio Access Technology
RAU Routing Area Update
SGSN Serving GPRS Support Node
TDMA Time Division Multiple Access
TLLI Temporary Logic Link Identifier
TS Technical Specifications
UE User Equipment
uPoD device Study of Power saving for MTC Devices
WCDMA Wideband Code Division Multiple Access
WiMAX Worldwide Interoperability for Microwave Access
Coverage Class (CC): At any point in time a wireless device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of radio interface performance attributes degraded compared to the reference coverage (e.g., up to 20 dB lower performance than that of the reference coverage). Coverage class determines the total number of blind transmissions to be used when transmitting/receiving radio blocks. An uplink/downlink coverage class applicable at any point in time can differ between different logical channels. Upon initiating a system access a wireless device determines the uplink/downlink coverage class applicable to the RACH/AGCH based on estimating the number of blind transmissions of a radio block needed by the BSS (radio access network node) receiver/wireless device receiver to experience a BLER (block error rate) of approximately 10%. The BSS determines the uplink/downlink coverage class to be used by a wireless device on the assigned packet channel resources based on estimating the number of blind transmissions of a radio block needed to satisfy a target BLER and considering the number of HARQ retransmissions (of a radio block) that will, on average, be needed for successful reception of a radio block using that target BLER. Note: a wireless device operating with radio interface performance attributes corresponding to the reference coverage (normal coverage) is considered to be in the best coverage class (i.e., coverage class 1) and therefore does not make any additional blind transmissions subsequent to an initial blind transmission. In this case, the wireless device may be referred to as a normal coverage wireless device. In contrast, a wireless device operating with radio interface performance attributes corresponding to an extended coverage (i.e., coverage class greater than 1) makes multiple blind transmissions. In this case, the wireless device may be referred to as an extended coverage wireless device. Multiple blind transmissions corresponds to the case where N instances of a radio block are transmitted consecutively using the applicable radio resources (e.g., the paging channel) without any attempt by the transmitting end to determine if the receiving end is able to successfully recover the radio block prior to all N transmissions. The transmitting end does this in attempt to help the receiving end realize a target BLER performance (e.g., target BLER ≤10% for the paging channel).

eDRX cycle: eDiscontinuous reception (eDRX) is a process of a wireless device disabling its ability to receive when it does not expect to receive incoming messages and enabling its ability to receive during a period of reachability when it anticipates the possibility of message reception. For eDRX to operate, the network coordinates with the wireless device regarding when instances of reachability are to occur. The wireless device will therefore wake up and enable message reception only during pre-scheduled periods of reachability. This process reduces the power consumption which extends the battery life of the wireless device and is sometimes called (deep) sleep mode.

Extended Coverage: The general principle of extended coverage is that of using blind transmissions for the control channels and for the data channels to realize a target block error rate performance (BLER) for the channel of interest. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

MTC device: A MTC device is a type of device where support for human interaction with the device is typically not required and data transmissions from or to the device are expected to be rather short (e.g., a maximum of a few hundred octets). MTC devices supporting a minimum functionality can be expected to only operate using normal cell contours and as such do not support the concept of extended coverage whereas MTC devices with enhanced capabilities may support extended coverage.

uPoD device: A uPoD device is similar to a MTC device except it also supports the mandatory use of a power saving state known as eDRX or Power Saving Mode (PSM) which allows for substantial battery savings to be realized in packet idle mode.

Nominal Paging Group: The specific set of EC-PCH blocks a device monitors once per eDRX cycle. The device determines this specific set of EC-PCH blocks using an algorithm that takes into account its IMSI, its eDRX cycle length and its downlink coverage class.

The need to support MTC devices using cellular technologies is increasing because the cellular technologies represent existing (and therefore convenient) deployments of service areas in which MTC devices can operate. As a result, more and more MTC devices are being deployed in wireless communication networks. One challenge facing the deployment of MTC devices in wireless communication networks is that the MTC devices will typically not have access to external power and, as such, will need to make use of batteries with target lifetimes in the area of years. To help realize such battery lifetimes, the use of extended discontinuous receive (eDRX) functionality may be seen as necessary, where eDRX cycle lengths will be in the area of minutes to hours (i.e., a MTC device will support one paging occasion per eDRX cycle), compared to legacy operation, where discontinuous receive (DRX) cycle lengths are in the area of a few seconds. The possibility of MTC device mobility also needs to be taken into account including the issue of how the reachability of a MTC device (e.g., using the MTC device's paging occasion) will be impacted as a result of the possible mobility of the MTC device.

The paging occasion (nominal paging group) used by a wireless device (e.g., MS, MTC device) on the radio interface is currently determined, at least in part, by the radio frame number. This is described in multiple 3GPP TSs such as, for example, 3GPP TS 36.331 V.12.5.0 (dated 2015 Mar. 27), 3GPP TS 45.002 V.12.4.0 (dated 2015 Mar. 21), and 3GPP TS 25.304 V.12.5.0 (dated 2015 Mar. 23) (the contents of these documents are incorporated herein by reference for all purposes). A problem with this technique is that the cycle of radio frame numbers in different cells will appear on the radio interface in an uncoordinated manner in the time domain (i.e., when paging a wireless device in a given paging area comprising multiple cells, the corresponding paging message will be sent on the radio interface to different cells at different points in time).

With this lack of time coordination, the spread between paging occasions for the same wireless device in different cells can be up to the maximum extended DRX cycle length, since the same radio frame number associated with the start of a nominal paging group can occur at different times in different cells. Therefore, the lack of time coordinated cells has some drawbacks when considered within the context of eDRX. Some of these drawbacks are as follows:

Drawback 1: A wireless device might be unreachable for paging, as the wireless device might miss its paging opportunities (in different cells) as a result of the wireless device moving between cells.

Drawback 2: A wireless device might receive and respond to the same paging message multiple times (in different cells) as a result of the wireless device moving between cells.

Drawback 3: Temporary identifiers (e.g., Packet Temporary Mobile Subscriber Identity (P-TMSI)) included in the paging message might become invalid if the paging messages are buffered in the radio access network (RAN) node for extended time periods (e.g., P-TMSI re-allocation could occur while a page with that P-TMSI is buffered). If this happens, then if the buffered page is eventually sent, this could then lead to either a paging failure (e.g., the intended wireless device is not paged) or, at least, a waste of paging bandwidth. To mitigate these problems, additional signaling and complexity would need to be introduced.

This lack of time coordinated cells and the resulting paging problem is addressed by the present disclosure.

SUMMARY

A CN node (e.g., SGSN), a RAN node (e.g., BSS), and various methods for addressing the aforementioned drawbacks are described in the independent claims. Advantageous embodiments of the CN node (e.g., SGSN), the RAN node (e.g., BSS), and various methods are further described in the dependent claims.

In one aspect, the present disclosure provides a CN node configured to interact with a plurality of RAN nodes to time coordinate a plurality of cells and maintain a reliability of paging a wireless device. The CN node comprises a processor and a memory that stores processor-executable instructions, wherein the processor interfaces with the memory to execute the processor-executable instructions, whereby the CN node is operable to obtain, from one of the RAN nodes, information indicating a time remaining until a next paging opportunity for the wireless device within the cells comprising a paging area of the wireless device. The CN node can obtain the time remaining until a next paging opportunity for the wireless device utilizing, for example, a modified Routing Area Update (RAU) procedure, a modified paging procedure, or a new dummy paging procedure. An advantage of the CN node implementing the obtain operation is that helps to address the lack of time coordinated cells and the resulting paging problem that adversely affects the legacy wireless communication system.

In another aspect, the present disclosure provides a method in a CN node for interacting with a plurality of RAN nodes to time coordinate a plurality of cells and maintain a reliability of paging a wireless device. The method comprises an obtaining step. In the obtaining step, the CN node obtains, from one of the RAN nodes, information indicating a time remaining until a next paging opportunity for the wireless device within the cells comprising a paging area of the wireless device. The CN node can obtain the time remaining until a next paging opportunity for the wireless device utilizing, for example, a modified Routing Area Update (RAU) procedure, a modified paging procedure, or a new dummy paging procedure. An advantage of the CN node implementing the obtaining step is that this helps to address the lack of time coordinated cells and the resulting paging problem that adversely affects the legacy wireless communication system.

In another aspect, the present disclosure provides a CN node comprising a processor and a memory that stores processor-executable instructions, wherein the processor interfaces with the memory to execute the processor-executable instructions, whereby the CN node is operable to perform a send operation and a receive operation. In the send operation, the CN node sends, to a RAN node, a dummy paging request associated with a wireless device. In the receive operation, the CN node receives, from the RAN node, a dummy paging response which includes a time remaining until a next paging opportunity for the wireless device. The CN node can send the dummy paging request as frequently or infrequently as desired to determine the time remaining until the next paging opportunity for the wireless device. Further, the dummy paging request is defined such that the RAN node is not required to send a paging message on the radio interface to the wireless device but instead calculates the time remaining until a next paging opportunity for the wireless device and sends the time remaining until a next paging opportunity for the wireless device to the CN node. An advantage of the CN node implementing the obtaining step is that this helps to address the lack of time coordinated cells and the resulting paging problem that adversely affects the legacy wireless communication system.

In yet another aspect, the present disclosure provides a method in a CN node for time coordinating a plurality of cells and maintaining a reliability of paging a wireless device. The method comprises a sending step and a receiving step. In the sending step, the CN node sends, to a RAN node, a dummy paging request associated with a wireless device. In the receive operation, the CN node receives, from the RAN node, a dummy paging response which includes a time remaining until a next paging opportunity for the wireless device. The CN node can send the dummy paging request as frequently or infrequently as desired to determine the time remaining until the next paging opportunity for the wireless device. Further, the dummy paging request is defined such that the RAN node is not required to send a paging message on the radio interface to the wireless device but instead calculates the time remaining until a next paging opportunity for the wireless device and sends the time remaining until a next paging opportunity for the wireless device to the CN node. An advantage of the CN node implementing the sending and receiving steps is that this helps to address the lack of time coordinated cells and the resulting paging problem that adversely affects the legacy wireless communication system.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
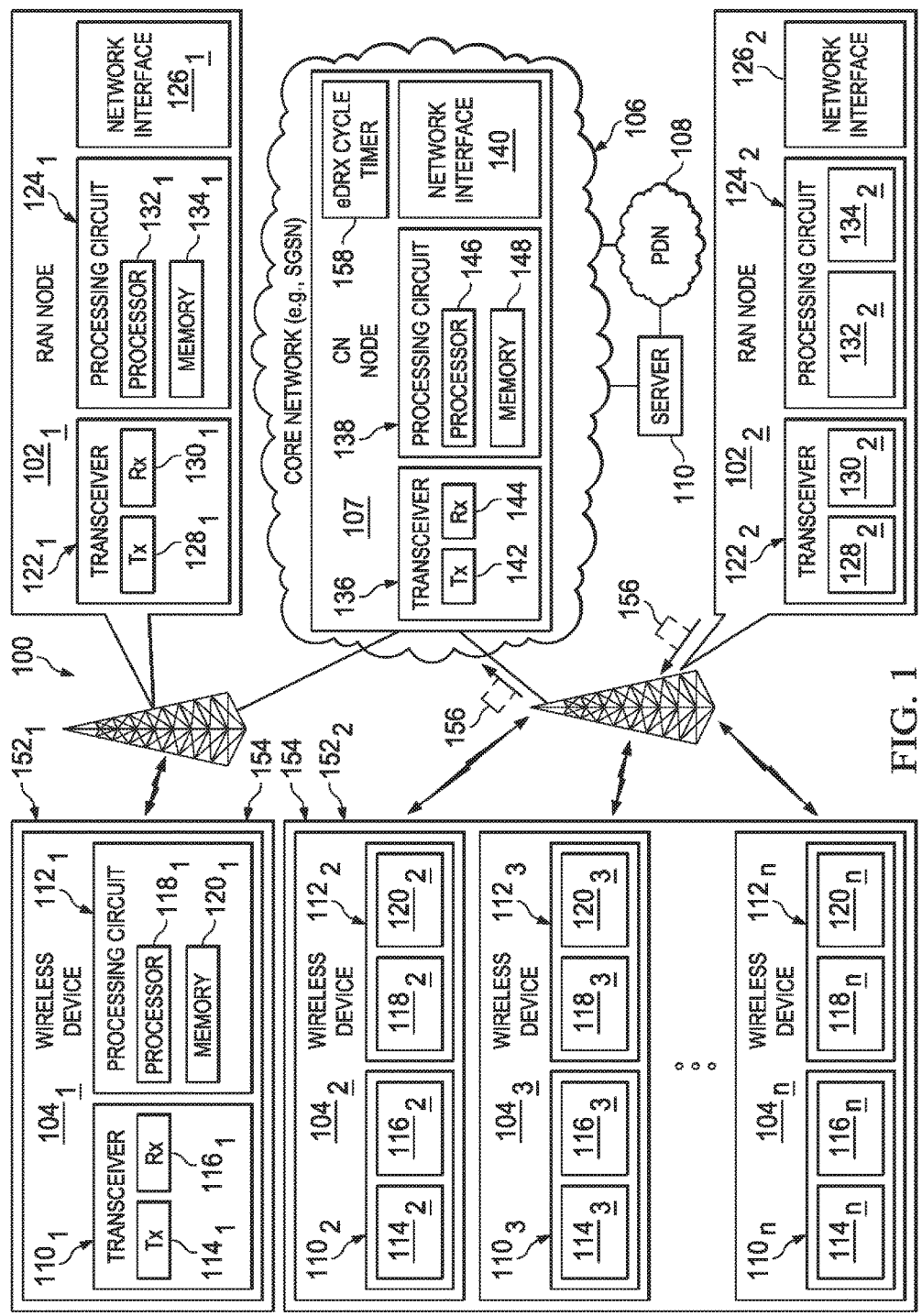
FIG. 1 is a diagram of an exemplary wireless communication network which includes a CN node, multiple RAN nodes, and multiple wireless devices which are all configured in accordance with an embodiment of the present disclosure.

A discussion is provided first herein to describe an exemplary wireless communication network that includes a CN node (e.g., SGSN, MME), multiple RAN nodes (e.g., BSSs, NodeBs, eNodeBs), and multiple wireless devices (e.g., MSs, MTC devices) in accordance with an embodiment of the present disclosure (see FIG. 1). Then, a discussion is provided to disclose different techniques that the CN node (e.g., SGSN, MME) and the RAN nodes (e.g., BSSs, NodeBs, eNodeBs) can use to realize time coordinated cells and maintain a reliability of paging a wireless device in accordance with various embodiments of the present disclosure (see FIGS. 2-5). Thereafter, a discussion is provided to explain the basic functionalities-configurations of the CN node (e.g., SGSN, MME) and the RAN node (e.g., BSS, NodeB, eNodeB) in accordance with different embodiments of the present disclosure (see FIGS. 6-13).

Exemplary Wireless Communication Network 100

Referring to FIG. 1, there is illustrated an exemplary wireless communication network 100 in accordance with the present disclosure. The wireless communication network 100 includes a core network 106 (which comprises at least one CN node 107) and multiple RAN nodes $102_1$ and $102_2$ (only two shown) which interface with multiple wireless devices $104_1, 104_2, 104_3 \ldots 104_n$. The wireless communication network 100 also includes many well-known components, but for clarity, only the components needed to describe the features of the present disclosure are described herein. Further, the wireless communication network 100 is described herein as being a GSM/EGPRS wireless communication network 100 which is also known as an EDGE wireless communication network 100. However, those skilled in the art will readily appreciate that the techniques of the present disclosure which are applied to the GSM/EGPRS wireless communication network 100 are generally applicable to other types of wireless communication systems, including, for example, WCDMA, LTE, and WiMAX systems.

The wireless communication network 100 includes the RAN nodes $102_1$ and $102_2$ (wireless access nodes—only two shown) which provide network access to the wireless devices $104_1, 104_2, 104_3 \ldots 104_n$. In this example, the RAN node $102_1$ is providing network access to wireless device $104_1$ while the RAN node $102_2$ is providing network access to wireless devices $104_2, 104_3 \ldots 104_n$. The RAN nodes $102_1$ and $102_2$ are connected to the core network 106 (e.g., SGSN core network 106) and, in particular, to the CN node 107 (e.g., SGSN 107). The core network 106 is connected to an external packet data network (PDN) 108, such as the Internet, and a server 110 (only one shown). The wireless devices $104_1, 104_2, 104_3 \ldots 104_n$ may communicate with one or more servers 110 (only one shown) connected to the core network 106 and/or the PDN 108.

The wireless devices $104_1, 104_2, 104_3 \ldots 104_n$ may refer generally to an end terminal (user) that attaches to the wireless communication network 100, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $102_1$ and $102_2$ (wireless access node $102_1$ and $102_2$) is used herein in the most general sense to refer to a base station, a wireless access node, or a wireless access point in a wireless communication network 100, and may refer to RAN nodes $102_1$ and $102_2$ that are controlled by a physically distinct radio network controller as well as to more autonomous access points, such as the so-called evolved Node Bs (eNodeBs) in Long-Term Evolution (LTE) networks.

Each wireless device $104_1, 104_2, 104_3 \ldots 104_n$ may include a transceiver circuit $110_1, 110_2, 110_3 \ldots 110_n$ for communicating with the RAN nodes $102_1$ and $102_2$, and a processing circuit $112_1, 112_2, 112_3 \ldots 112_n$ for processing signals transmitted from and received by the transceiver circuit $110_1, 110_2, 110_3 \ldots 110_n$ and for controlling the operation of the corresponding wireless device $104_1, 104_2, 104_3 \ldots 104_n$. The transceiver circuit $110_1, 110_2, 110_3 \ldots 110_n$ may include a transmitter $114_1, 114_2, 114_3 \ldots 114_n$ and a receiver $116_1, 116_2, 116_3 \ldots 116_n$, which may operate according to any standard, e.g., the GSM/EDGE standard. The processing circuit $112_1, 112_2, 112_3 \ldots 112_n$ may include a processor $118_1, 118_2, 118_3 \ldots 118_n$ and a memory $120_1, 120_2, 120_3 \ldots 120_n$ for storing program code for controlling the operation of the corresponding wireless device $104_1, 104_2, 104_3 \ldots 104_n$. The program code may include code for performing the procedures (e.g., transmitting an LLC PDU comprising a RAU Request message, receiving an LLC PDU comprising a RAU Accept message, and transmitting an LLC PDU comprising a RAU Complete message) as described hereinafter.

Each RAN node $102_1$ and $102_2$ (wireless access node $102_1$ and $102_2$) may include a transceiver circuit $122_1$ and $122_2$ for communicating with wireless devices $104_1, 104_2, 104_3 \ldots 104_n$, a processing circuit $124_1$ and $124_2$ for processing signals transmitted from and received by the transceiver circuit $122_1$ and $122_2$ and for controlling the operation of the corresponding RAN node $102_1$ and $102_2$, and a network interface $126_1$ and $126_2$ for communicating with the core network 106. The transceiver circuit $122_1$ and $122_2$ may include a transmitter $128_1$ and $128_2$ and a receiver $130_1$ and $130_2$, which may operate according to any standard, e.g., the GSM/EDGE standard. The processing circuit $124_1$ and $124_2$ may include a processor $132_1$ and $132_2$, and a memory $134_1$ and $134_2$ for storing program code for controlling the operation of the corresponding RAN node $102_1$ and $102_2$. The program code may include code for performing the procedures (e.g., receiving an LLC PDU comprising a RAU Request message, transmitting/receiving a BSSGP PDU comprising the RAU Request message, receiving/transmitting a BSSGP PDU comprising a RAU Accept message, IMSI, eDRX cycle length, and coverage class (not applicable for Study of Power Saving for MTC Devices (uPoD devices)), transmitting an LLC PDU comprising the RAU Accept message, receiving an LLC PDU comprising a RAU Complete message, calculating a time remaining until the next paging opportunity, transmitting/receiving a BSSGP PDU comprising the RAU Complete message and the time remaining until the next paging opportunity) as described hereinafter with respect to FIGS. 10 and 12.

The CN node 107 (e.g., SGSN 107, MME 107) may include a transceiver circuit 136 for communicating with the RAN nodes $102_1$ and $102_2$, a processing circuit 138 for processing signals transmitted from and received by the transceiver circuit 136 and for controlling the operation of the CN node 107, a network interface 140 for communicating with the RAN nodes $102_1$ and $102_2$, and an eDRX cycle timer 158 for determining the periodicity of paging opportunities for wireless devices $104_1$, $104_2$, $104_3$ ... $104_n$. The transceiver circuit 136 may include a transmitter 142 and a receiver 144, which may operate according to any standard, e.g., the GSM/EDGE standard. The processing circuit 138 may include a processor 146 and a memory 148 for storing program code for controlling the operation of the CN node 107. The program code may include code for performing the procedures as described hereinafter with respect to FIGS. 6 and 8.

Time Coordinated Cells and Reliability of Paging a Wireless Device

Realizing Time Coordinated Cells—Radio Interface

One aspect of the present disclosure involves the coordination of paging occasions across the radio interface of multiple cells $152_1$ and $152_2$ (for example), thus mitigating the drawbacks resulting from using eDRX as described above in the Background Section. This means that each paging occasion of a wireless device $104_2$ (for example) needs to occur at approximately the same time (e.g., within a certain timing accuracy) over the radio interface for each cell $152_1$ and $152_2$ in the set of cells $152_1$ and $152_2$ used for paging that wireless device $104_2$ (see FIG. 1). In the illustrated example associated with FIG. 1, the wireless device $104_2$ is currently located in cell $152_1$ but it has a paging area 154 that includes cells $152_1$ and $152_2$ where the RAN node $102_1$ manages cell $152_1$ and the RAN node $102_2$ manages cell $152_2$.

In general it should be appreciated that per the present disclosure the greater the number of cells within each set of time coordinated cells, the greater the mitigation of the drawbacks described above in the Background Section. Further, the greatest mitigation of these drawbacks will be realized if the paging area consists of a set of time coordinated cells, wherein the paging occasion for any wireless device in that paging area occurs at approximately the same time (e.g., within a predetermined time period) on the respective radio interfaces of these cells.

Realizing Time Coordinated Cells—CN Node 107 (e.g., SGSN 107)

Figure 2:
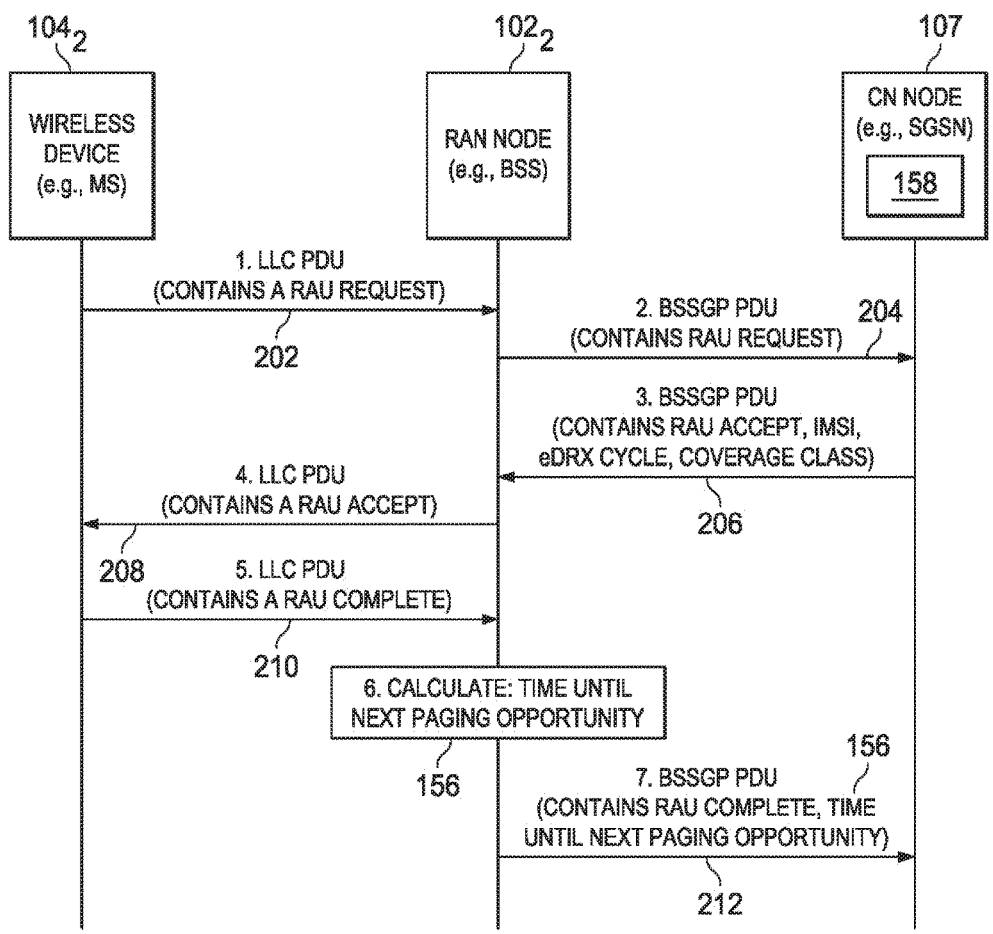
FIG. 2 is a signal diagram illustrating a modified RAU procedure that supports time coordinated cells in accordance with an embodiment of the present disclosure.

One aspect of the present disclosure involves the CN node 107 (e.g., SGSN 107) having knowledge of when the paging occasion of a wireless device $104_2$ (for example) is approaching within the set of cells $152_1$ and $152_2$ comprising the paging area 154 of that wireless device $104_2$. This can be realized as follows: upon receiving a LLC PDU (containing a RAU Complete message) from a wireless device $104_2$ (for example), a RAN node $102_2$ (e.g., BSS $102_2$) that has knowledge of the International Mobile Subscriber Identity (IMSI), eDRX cycle length, and coverage class (not applicable for Study of Power Saving for MTC Devices (uPoD devices)) of the corresponding wireless device $104_2$ (for example) shall calculate the time remaining until the next paging opportunity 156 (i.e., in minutes and seconds) for that wireless device $104_2$. Thereafter, the RAN node $102_2$ (e.g., BSS $102_2$) will forward the received LLC PDU and the corresponding time remaining until the next paging opportunity 156 information to the CN node 107 (e.g., SGSN 107). An example, of the reception of a LLC PDU from a wireless device $104_2$ (for example) wherein the RAN node $102_2$ already has the information it needs to calculate the time remaining until the next paging opportunity 156 for that wireless device $104_2$ can occur within the context of a modified RAU procedure as shown in FIG. 2. Several exemplary ways that the CN node 107 (e.g., SGSN 107) can obtain the time remaining until the next paging opportunity 156 for any one of the wireless devices $104_1$, $104_2$, $104_3$ ... $104_n$ are discussed below with respect to FIGS. 2-4.

Referring to FIG. 2, there is a signal diagram illustrating a modified RAU procedure that supports time coordinated cells in accordance with an embodiment of the present disclosure. Basically, the legacy Routing Area Update (RAU) procedure can be modified so that the RAU procedure can be used in accordance with an embodiment of the present disclosure as an opportunity for the CN node 107 (e.g., SGSN 107) to provide the RAN node $102_2$ (e.g., BSS $102_2$) with the information (e.g., TLLI-specific parameters) that the RAN node $102_2$ (e.g., BSS $102_2$) uses to calculate the time remaining until the next paging opportunity 156 and provide the calculated time remaining until the next paging opportunity 156 to the CN node 107. An exemplary modified RAU procedure in accordance with an embodiment of the present disclosure can have the following steps:

1. The wireless device $104_2$ (for example) transmits a LLC PDU 202 which contains a RAU Request to the RAN node $102_2$ (e.g., BSS $102_2$).

2. The RAN node $102_2$ (e.g., BSS $102_2$) transmits a BSSGP PDU 204 which contains the RAU Request to the CN node 107 (e.g., SGSN 107).

3. The CN node 107 (e.g., SGSN 107) transmits a BSSGP PDU 206 which contains a RAU Accept and the wireless device $104_2$'s IMSI, eDRX cycle, and coverage class (e.g., the wireless device $104_2$'s TLLI specific parameters) to the RAN node $102_2$ (e.g., BSS $102_2$). It should be noted that by including the wireless device $104_2$'s IMSI, eDRX cycle length, and coverage class information within the BSSGP PDU 206 which is used to send (step 3) the RAU Accept to the RAN node $102_2$ (e.g., BSS $102_2$), the RAN node $102_2$ (e.g., BSS $102_2$) can now calculate (step 6) the next paging occasion and in particular the time remaining until the next paging opportunity 156 for the wireless device $104_2$ to which the RAU Accept is being sent. Further, the RAN node $102_2$ (e.g., BSS $102_2$) can retain these TLLI specific parameters (e.g., IMSI, eDRX cycle length, and coverage class) for a certain minimum amount of time (e.g., 10 seconds).

4. The RAN node $102_2$ (e.g., BSS $102_2$) transmits a LLC PDU 208 which contains the RAU Accept to the wireless device $104_2$.

5. The wireless device $104_2$ transmits a LLC PDU 210 which contains a RAU Complete to the RAN node $102_2$ (e.g., BSS $102_2$).

6. The RAN node $102_2$ (e.g., BSS $102_2$) calculates the time remaining until the next paging opportunity 156 for the wireless device $104_2$. Basically, if the RAN node $102_2$ (e.g., BSS $102_2$) receives (step 5) an uplink LLC PDU from the wireless device $104_2$ having a TLLI for which the RAN node $102_2$ (e.g., BSS $102_2$) still has these TLLI specific parameters, then the RAN node $102_2$ (e.g., BSS $102_2$) will calculate (step 6) the time remaining until the next paging opportunity 156 and include this time remaining until the next paging opportunity 156 information along with the received uplink LLC PDU within the BSSGP PDU 212 that the RAN node $102_2$ (e.g., BSS $102_2$) sends (step 7) to the CN node 107 (e.g., SGSN 107). An example of how the RAN node $102_2$ (e.g., BSS $102_2$) can calculate the time remaining until the next paging opportunity 156 is provided below with respect to TABLE 1 and FIG. 5.

7. The RAN node $102_2$ (e.g., BSS $102_2$) transmits a BSSGP PDU 212 which contains the RAU Complete and the time remaining until the next paging opportunity 156 for the wireless device 104$_2$ to the CN node 107 (e.g., SGSN 107).

Note: Steps 3, 6 and 7 involve new functionality when comparing the legacy RAU procedure and the modified RAU procedure in accordance with the present disclosure. A discussion is provided below which describes some exemplary ways that the CN node 107 (e.g., SGSN 107) can utilize the time remaining until the next paging opportunity 156 to realize time coordinated cells 152$_1$ and 152$_2$ and maintain a reliability of paging the wireless device 104$_2$ in accordance with the present disclosure.

Figure 3:
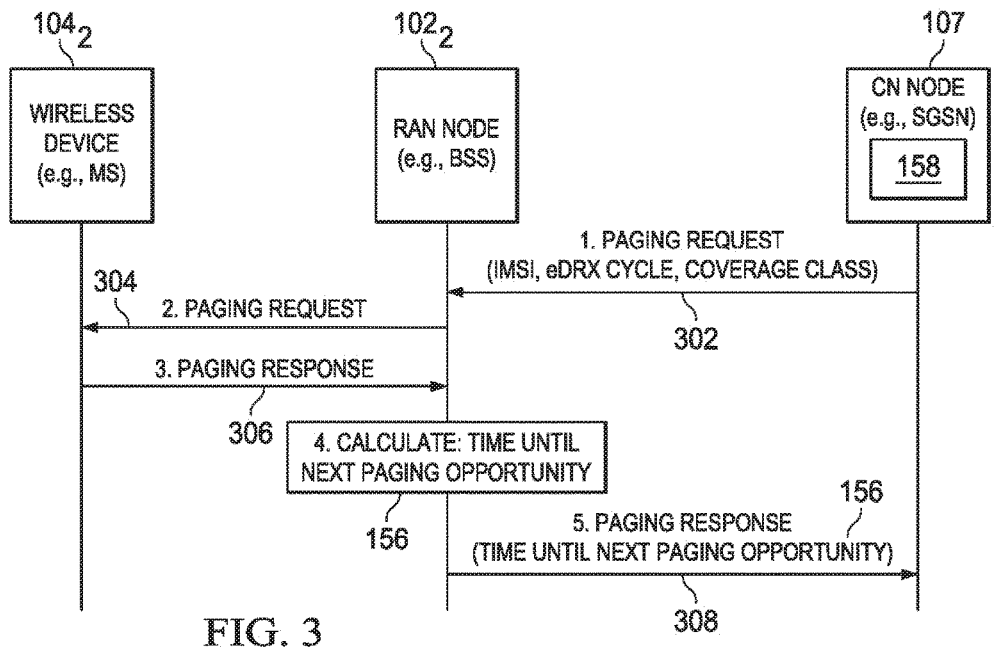
FIG. 3 is a signal diagram illustrating a modified paging procedure that supports time coordinated cells in accordance with an embodiment of the present disclosure.

Referring to FIG. 3, there is a signal diagram illustrating a modified paging procedure that supports time coordinated cells in accordance with an embodiment of the present disclosure. Basically, the legacy paging procedure can be modified so that the paging procedure can be used in accordance with an embodiment of the present disclosure as an opportunity for the CN node 107 (e.g., SGSN 107) to provide the RAN node 102$_2$ (e.g., BSS 102$_2$) with the information (e.g., TLLI specific parameters) that the RAN node 102$_2$ (e.g., BSS 102$_2$) uses to calculate the time remaining until the next paging opportunity 156 and provide the calculated time remaining until the next paging opportunity 156 to the CN node 107. An exemplary modified paging procedure in accordance with an embodiment of the present disclosure can have the following steps:

1. The CN node 107 (e.g., SGSN 107) transmits a paging request 302 to the RAN node 102$_2$ (e.g., BSS 102$_2$). The paging request 302 includes the wireless device 104$_2$'s IMSI, eDRX cycle, and coverage class (e.g., the wireless device 104$_2$'s TLLI specific parameters). The RAN node 102$_2$ stores the TLLI specific parameters needed to calculate the next paging opportunity 156 for the indicated wireless device 104$_2$ for a certain minimum amount of time (e.g., 10 seconds).

2. The RAN node 102$_2$ (e.g., BSS 102$_2$) transmits a paging request 304 to the wireless device 104$_2$.

3. The wireless device 104$_2$ transmits a paging response 306 to the RAN node 102$_2$ (e.g., BSS 102$_2$).

4. The RAN node 102$_2$ (e.g., BSS 102$_2$) calculates the time remaining until the next paging opportunity 156 for the wireless device 104$_2$. An example of how the RAN node 102$_2$ (e.g., BSS 102$_2$) can calculate the time remaining until the next paging opportunity 156 is provided below with respect to TABLE 1 and FIG. 5.

5. The RAN node 102$_2$ (e.g., BSS 102$_2$) transmits a page response 308 which contains the time remaining until the next paging opportunity 156 for the wireless device 104$_2$ to the CN node 107 (e.g., SGSN 107).

Note: Steps 1, 4 and 5 involve new functionality when comparing the legacy paging procedure to the modified paging procedure in accordance with the present disclosure. A discussion is provided below which describes some exemplary ways that the CN node 107 (e.g., SGSN 107) can utilize the time remaining until the next paging opportunity 156 to realize time coordinated cells 152$_1$ and 152$_2$ and maintain a reliability of paging the wireless device 104$_2$ in accordance with the present disclosure.

Figure 4:
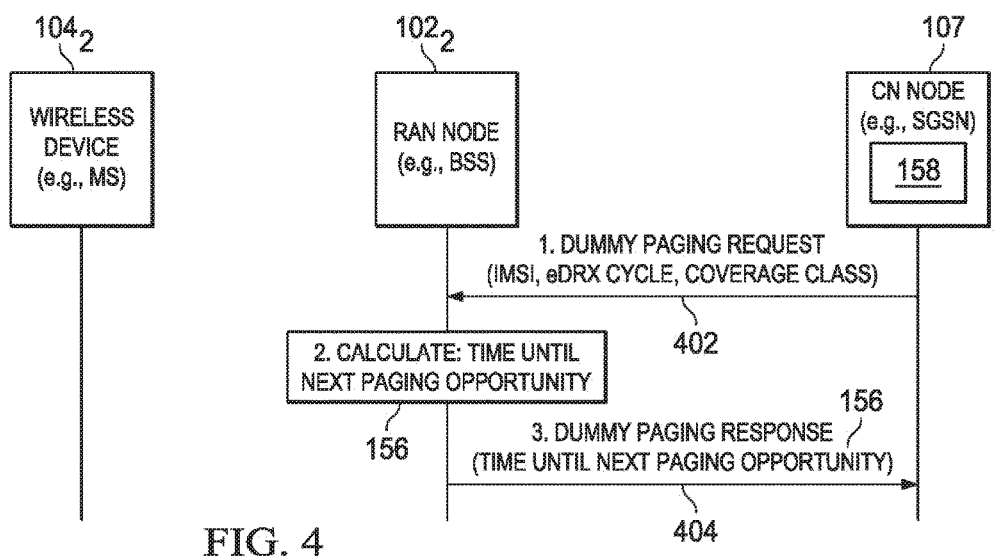
FIG. 4 is a signal diagram illustrating a dummy paging procedure that supports time coordinated cells in accordance with an embodiment of the present disclosure.

Referring to FIG. 4, there is a signal diagram illustrating how to use a dummy paging procedure to support time coordinated cells in accordance with an embodiment of the present disclosure. An exemplary dummy paging procedure in accordance with another embodiment of the present disclosure can have the following steps:

1. The CN node 107 (e.g., SGSN 107) transmits a dummy paging request 402 to the RAN node 102$_2$ (e.g., BSS 102$_2$). The dummy paging request 402 includes the wireless device 104$_2$'s IMSI, eDRX cycle, and coverage class (e.g., the wireless device 104$_2$'s TLLI specific parameters). Further, the dummy paging request 402 is defined to trigger the RAN node 102$_2$ (e.g., BSS 102$_2$) to calculate (step 2) the time remaining until the next paging opportunity 156 for the wireless device 104$_2$ and then transmit (step 3) a corresponding dummy paging response 404 which includes the time remaining until the next paging opportunity 156 for the wireless device 104$_2$ to the CN node 107 (e.g., SGSN 107). In this example, the RAN node 102$_2$ (e.g., BSS 102$_2$) upon receiving the specially defined dummy paging request 402 does not transmit a paging message over a radio interface to the wireless device 104$_2$.

2. The RAN node 102$_2$ (e.g., BSS 102$_2$) calculates the time remaining until the next paging opportunity 156 for the wireless device 104$_2$. An example of how the RAN node 102$_2$ (e.g., BSS 102$_2$) can calculate the time remaining until the next paging opportunity 156 is provided below with respect to TABLE 1 and FIG. 5.

3. The RAN node 102$_2$ (e.g., BSS 102$_2$) transmits a dummy page response 404 which contains the time remaining until the next paging opportunity 156 for the wireless device 104$_2$ to the CN node 107 (e.g., SGSN 107). The dummy paging mechanism associated with steps 1 and 3, allows the CN node 107 (e.g., SGSN 107) to verify its understanding of when the next paging opportunity will occur for a given wireless device 104$_2$ (for example), and therefore, may be used as frequently or infrequently as desired by the CN node 107 (e.g., SGSN 107).

Note: Steps 1, 2 and 3 are associated with a new dummy paging procedure in accordance with the present disclosure. A discussion is provided below which describes some exemplary ways that the CN node 107 (e.g., SGSN 107) can utilize the time remaining until the next paging opportunity 156 to realize time coordinated cells 152$_1$ and 152$_2$ and maintain a reliability of paging the wireless device 104$_2$ in accordance with the present disclosure.

In continuing the discussion associated with the various procedures discussed above with respect to FIGS. 2-4, the CN node 107 (e.g., SGSN 107) can use the received time remaining until the next paging opportunity 156 along with its knowledge of the wireless device-specific eDRX cycle length (e.g., established during the legacy RAU procedure or the modified RAU procedure of FIG. 2) to maintain a wireless device-specific eDRX cycle timer 158 to determine the periodicity of paging opportunities for the wireless device 104$_2$ (for example). The value of the eDRX cycle timer 158 remains valid for the wireless device 104$_2$ (unless it is modified due to reception of new eDRX cycle information or a new value for time remaining until the next paging opportunity 156) regardless of whether the CN node 107 (e.g., SGSN 107) actually triggers the transmission of a page to that wireless device 104$_2$ using any of the ongoing paging opportunities.

The CN node 107 (e.g., SGSN 107) uses the reception of an LLC PDU (e.g., FIG. 2's BSSGP PDU 212, FIG. 3's paging response 308, FIG. 4's dummy paging response 404), including the time remaining until the next paging opportunity 156 as an opportunity to verify its understanding of the periodicity of paging opportunities for the associated wireless device 104$_2$. If an LLC PDU (e.g., FIG. 2's BSSGP PDU 212, FIG. 3's paging response 308, FIG. 4's dummy paging response 404) indicates a next paging opportunity that is different from when the CN node 107 (e.g., SGSN 107) expected the next paging opportunity to occur, then the CN node 107 (e.g., SGSN 107) will modify the eDRX cycle timer 158 accordingly for the corresponding wireless device $104_2$.

The CN node 107 (e.g., SGSN 107) can set the eDRX cycle timer 158 to expire a predetermined time (e.g., few seconds) before the next paging opportunity to ensure the paging requests (if any) for wireless device $104_2$ arrive at the set of RAN nodes $102_1$ and $102_2$ (BSS $102_1$ and $102_2$) associated with the paging area 154 of the wireless device $104_2$ before the paging opportunity for the wireless device $104_2$ occurs on the radio interfaces of the time coordinated cells $152_1$ and $152_2$. In this regard, the CN node 107 (e.g., SGSN 107) creates a paging request upon the reception of a N-PDU for the wireless device $104_2$, and the paging request is buffered in the CN node 107 (e.g., SGSN 107) until the expiration of the eDRX cycle timer 158 of the corresponding wireless device $104_2$. If there is a buffered paging request when the eDRX cycle timer 158 expires, then the CN node 107 (e.g., SGSN 107) transmits paging requests to the appropriate set of RAN nodes $102_1$ and $102_2$ (e.g., BSS $102_1$ and $102_2$) which are managing the cells $152_1$ and $152_2$ of the applicable paging area 154 of the wireless device $104_2$) and restarts the eDRX cycle timer 158. Upon receiving the paging request, the RAN nodes $102_1$ and $102_2$ (e.g., BSS $102_1$ and $102_2$) each calculate the precise and substantially same paging opportunity on the radio interface of the cell $152_1$ and $152_2$ that it manages using the IMSI, the eDRX cycle length and the coverage class (absent for uPoD devices) information included within the paging request for the wireless device $104_2$. On the other hand, if there is no buffered paging request when the eDRX cycle timer 158 expires, then the CN node 107 (e.g., SGSN 107) restarts the eDRX cycle timer 158 based on its knowledge of the eDRX cycle length of the wireless device $104_2$.

One exemplary way the RAN node $102_2$ (for example) can calculate the time remaining until the next paging opportunity 156 has been described in GP-150133 entitled "EC-GSM—Paging Group Determination" and GP-150259 entitled "Pseudo CR 45.820—EC-GSM, Paging Group Determination" both submitted to GERAN #65, Mar. 9-13, 2015 (the contents of these documents are incorporated herein by reference for all purposes). In this example, when sending a paging request to the RAN node $102_2$ (e.g., BSS $102_2$), the CN node 107 (e.g., SGSN 107) includes an indication of the eDRX cycle, DL CC and IMSI associated with the target wireless device $104_2$ (for example) thereby allowing the RAN node $102_2$ to determine the next occurrence of the nominal paging group for that wireless device $104_2$ within its eDRX cycle as follows:

N is the number of paging groups corresponding to a given DL CC within a given eDRX cycle and is determined based on EXTENDED_DRX_MFRMS, EC_PCH_BLKS_MFRM, and CC_EC_PCH_BLKS where:

EXTENDED_DRX_MFRMS is the number of 51-multiframes per eDRX cycle determined as per TABLE 1 (GP-150133's_Table 1) below.

EC_PCH_BLKS_MFRM indicates the number of EC-PCH blocks (i.e., the number of 2 bursts blocks) per 51-multiframe. For EC-GSM this can be fixed at 16 which is the equivalent of the legacy PCH_BLKS_MFRM parameter indicating 8 PCH blocks per 51-multiframe.

CC_EC_PCH_BLKS is the number of EC-PCH blocks required for a given DL CC (where the number of blind transmission required for any given DL CC is pre-defined by the specifications).

The set of eDRX cycle lengths identified by TABLE 1 (GP-150133's Table 1) is selected such that each member of the set occurs an integral number of times within the full TDMA FN space.

N=(EC_PCH_BLKS_MFRM×EXTENDED_DRX_MFRMS)/CC_EC_PCH_BLKS. The EC-PCH CC1 block for a device using a given eDRX cycle is determined based on where the nominal paging group occurs for DL CC=1 (i.e., CC_EC_PCH_BLKS=1)

EC-PCH CC1 block=mod (IMSI, N) where N=(16×EXTENDED_DRX_MFRMS)/1.

TABLE 1

Set of eDRX Cycles Supported

| eDRX Cycle Value (EXTENDED_DRX) | Target eDRX Cycle Length | Number of 51-MF per eDRX Cycle (EXTENDED_DRX_MFRMS) | eDRX Cycles per TDMA FN Space |
|---|---|---|---|
| 0 | ~24.5 seconds | 104 | 512 |
| 1 | ~49 seconds | 208 | 256 |
| 2 | ~1.63 minutes | 416 | 128 |
| 3 | ~3.25 minutes | 832 | 64 |
| 4 | ~6.5 minutes | 1664 | 32 |
| 5 | ~13 minutes | 3328 | 16 |
| 6 | ~26 minutes | 6656 | 8 |
| 7 | ~52 minutes | 13312 | 4 |

Note 1:
53248 51-multiframes occur with the TDMA FN space (2715648 TDMA frames)

Note 2:
All remaining EXTENDED_DRX values are reserved

EXAMPLE

IMSI=00000000 01001001 00110000 00000001=4796417 and EXTENDED_DRX_MFRMS=6656 (i.e., the eDRX cycle ~26 minutes)

N=16*6656=106496.

CC1 Nominal Paging Group=mod (IMSI, 106496)=4097 which occurs in the $4098^{th}$ EC-PCH block of the eDRX cycle (i.e., in the $2^{nd}$ EC-PCH block in 51-multiframe #257.

Figure 6:
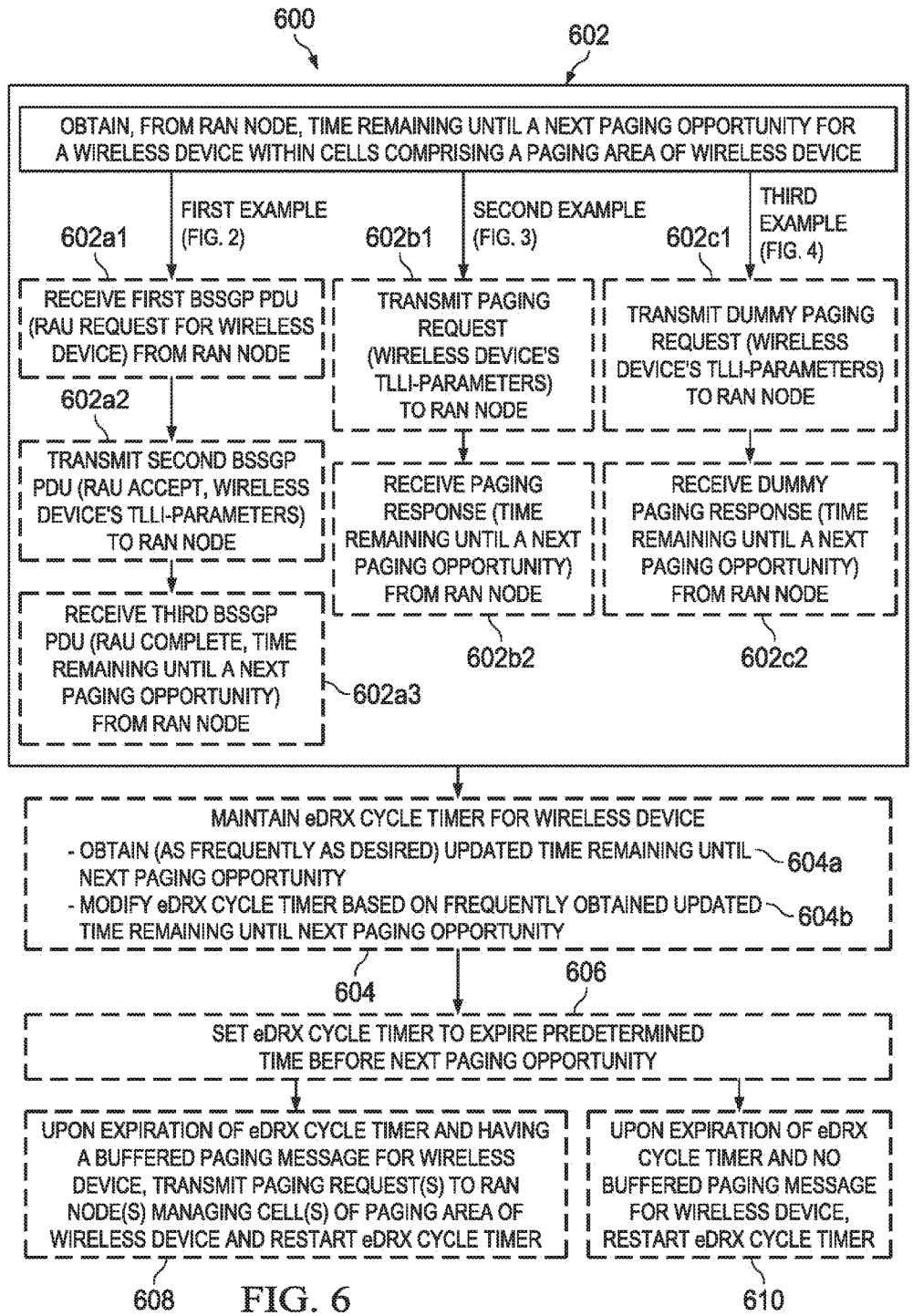
FIG. 6 is a flowchart of a method implemented in the CN node in accordance with an embodiment of the present disclosure.

The nominal paging groups associated with other DL CC for the same IMSI and eDRX cycle length are as shown in FIG. 6.2.4.3-1 (e.g., the nominal paging group for DL CC 2 occurs in the $1^{st}$ and $2^{nd}$ EC-PCH blocks of 51-multiframe #257).

Figure 5:
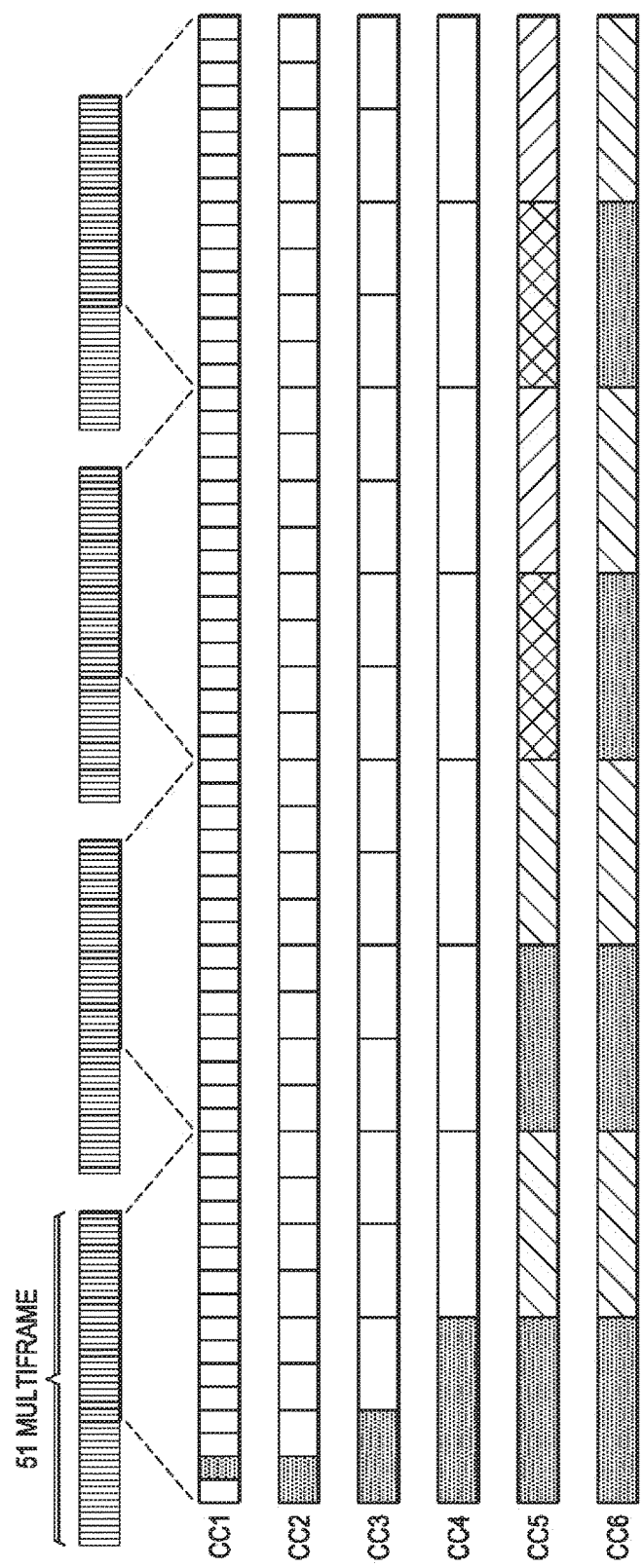
FIG. 5 is a diagram used to explain an exemplary way that a RAN node can calculate a time remaining until a next paging opportunity for a wireless device.

As can be seen in FIG. 5 (GP-150133's FIG. 1—Cover Class Specific Paging Groups), using this method for establishing DL CC specific nominal paging groups for a given eDRX cycle ensures that for a given IMSI the nominal paging groups associated with all possible DL CC will fall within 4 51-multiframes of the EC-PCH CC1 block. As such, if a wireless device $104_2$ (for example) sends a CC update to the CN node 107 (e.g., SGSN 107) (e.g., using a Cell Update) e.g., 5 seconds prior to the next occurrence of its nominal paging group, the RAN node $102_2$ (e.g., BSS $102_2$) will still be able to send a page in time for it to be received by the device monitoring according to its DL CC incremented by 1 level. With the ability to update its DL CC as late as a few seconds before the next occurrence of its nominal paging group, a device will thereby experience a substantially reduced probability of missing a page due to it having to select a higher downlink coverage class shortly before its next paging opportunity (i.e., shortly before the next instance of its nominal paging group).

It should be understood that a RAN node $102_2$ (for example) always has precise knowledge of the ongoing transmission of specific TDMA frames over the radio interface corresponding to each of the set of cells it manages. As such, once the RAN node $102_2$ determines the nominal paging group of a wireless device $104_2$ (for example) it can calculate the time remaining until the next paging opportunity 156 for that wireless device $104_2$. It should also be appreciated that there are other ways in addition to the one described herein as disclosed in GP-150133 and GP-150259 that the RAN node $102_2$ can use to calculate the time remaining until the next paging opportunity 156.

Basic Functionalities-Configurations of CN Node 107 and RAN Node $102_2$ (for Example)

Referring to FIG. 6, there is a flowchart of a method 600 implemented in the CN node 107 (e.g., SGSN 107) which interacts with RAN nodes $102_1$ and $102_2$ (BSS $102_1$ and $102_2$) to time coordinate cells $152_1$ and $152_2$ and maintain a reliability of paging a wireless device $104_2$ (for example) in accordance with an embodiment of the present disclosure. At step 602, the CN node 107 obtains, from one of the RAN nodes $102_1$ or $102_2$, information indicating a time remaining until a next paging opportunity 156 for the wireless device $104_2$ within the cells $152_1$ and $152_2$ comprising a paging area 154 of the wireless device $104_2$. Several examples of how the CN node 107 can obtain the time remaining until a next paging opportunity 156 for the wireless device $104_2$ are as follows:

1. The CN node 107 can per step 602 obtain from one of the RAN nodes $102_1$ or $102_2$, the time remaining until a next paging opportunity 156 by: (1) receiving a first BSSGP PDU 204 containing a RAU Request from one RAN node $102_2$ (for example), wherein the RAU Request is associated with the wireless device $104_2$ (step 602a1); (2) transmitting a second BSSGP PDU 206 containing a RAU Accept to the one RAN node $102_2$, wherein the second BSSGP PDU 206 includes TLLI parameters (e.g., IMSI, eDRX cycle length, coverage class (not applicable for uPoD devices)) associated with the wireless device $104_2$ (step 602a2); and (3) receiving a third BSSGP PDU 212 containing a RAU Complete from the one RAN node $102_2$, wherein the third BSSGP PDU 212 includes the time remaining until a next paging opportunity 156 for the wireless device $104_2$ (step 602a3). See also FIG. 2 and its associated text for another discussion about this exemplary way that the CN node 107 can obtain the time remaining until a next paging opportunity 156 for the wireless device $104_2$.

2. The CN node 107 can per step 602 obtain from one of the RAN nodes $102_1$ or $102_2$, the time remaining until a next paging opportunity 156 by: (1) transmitting a paging request 302 to the one RAN node $102_2$ (for example), wherein the paging request 302 includes TLLI parameters (e.g., IMSI, eDRX cycle length, coverage class (not applicable for uPoD devices)) associated with the wireless device $104_2$ (step 602b1); and (2) receiving a paging response 308 from the one RAN node $102_2$, wherein the paging response 308 includes the time remaining until a next paging opportunity 156 for the wireless device $104_2$ (step 602b2). See also FIG. 3 and its associated text for another discussion about this exemplary way that the CN node 107 can obtain the time remaining until a next paging opportunity 156 for the wireless device $104_2$.

3. The CN node 107 can per step 602 obtain from one of the RAN nodes $102_1$ or $102_2$, the time remaining until a next paging opportunity 156 by: (1) transmitting a dummy paging request 402 to the one RAN node $102_2$ (for example), wherein the dummy paging request 402 includes TLLI parameters (e.g., IMSI, eDRX cycle length, coverage class (not applicable for uPoD devices)) associated with the wireless device $104_2$ (step 602c1); and (2) receiving a dummy paging response 404 from the one RAN node $102_2$, wherein the dummy paging response 404 includes the time remaining until a next paging opportunity 156 for the wireless device $104_2$ (step 602c2) (note: the dummy paging response 404 corresponds to the dummy paging request 402, i.e., when a given dummy paging response 404 is received it always corresponds to one specific previously transmitted dummy paging request 402). See also FIG. 4 and its associated text for another discussion about this exemplary way that the CN node 107 can obtain the time remaining until a next paging opportunity 156 for the wireless device $104_2$. Recall in this case the RAN node $102_2$ does not transmit a paging message over a radio interface to the wireless device $104_2$, and the CN node 107 can send the dummy paging request 402 as frequently as it desires to verify its understanding of when the next paging opportunity will occur for a given wireless device $104_2$ (for example).

At step 604, the CN node 107 maintains an eDRX cycle timer 158 associated with the wireless device $104_2$ by using the obtained time remaining until the next paging opportunity 156 for the wireless device $104_2$ and an eDRX cycle length associated with the wireless device $104_2$. For example, the CN node 107 can maintain the eDRX cycle timer 158 by: (1) obtaining updated information indicating the time remaining until the next paging opportunity 156 for the wireless device $104_2$ (step 604a) (note: the updated information can be obtained as frequently or infrequently as desired by the CN node 107); and (2) modifying the eDRX cycle timer 158 based on the obtained updated information indicating the time remaining until the next paging opportunity 156 for the wireless device $104_2$ (step 604b). At step 606, the CN node 107 sets the eDRX cycle timer 158 to expire a predetermined time (e.g., few seconds) before the next paging opportunity for the wireless device $104_2$. Upon the expiration of the eDRX cycle timer 158 and based on there being a buffered paging message for the wireless device $104_2$, the CN node 107 at step 608 transmits a set of paging requests to the RAN nodes $102_1$ and $102_2$ managing the cells $152_1$ and $152_2$ comprising the paging area 154 of the wireless device $104_2$ and restarts the eDRX cycle timer 158 (recall: the CN node 107 will buffer a paging message for the wireless device $104_2$ upon receiving a N-PDU for the wireless device $104_2$). Upon the expiration of the eDRX cycle timer 158 and based on there being no buffered paging message for the wireless device $104_2$, the CN node 107 at step 610 restarts the eDRX cycle timer 158.

Figure 7:
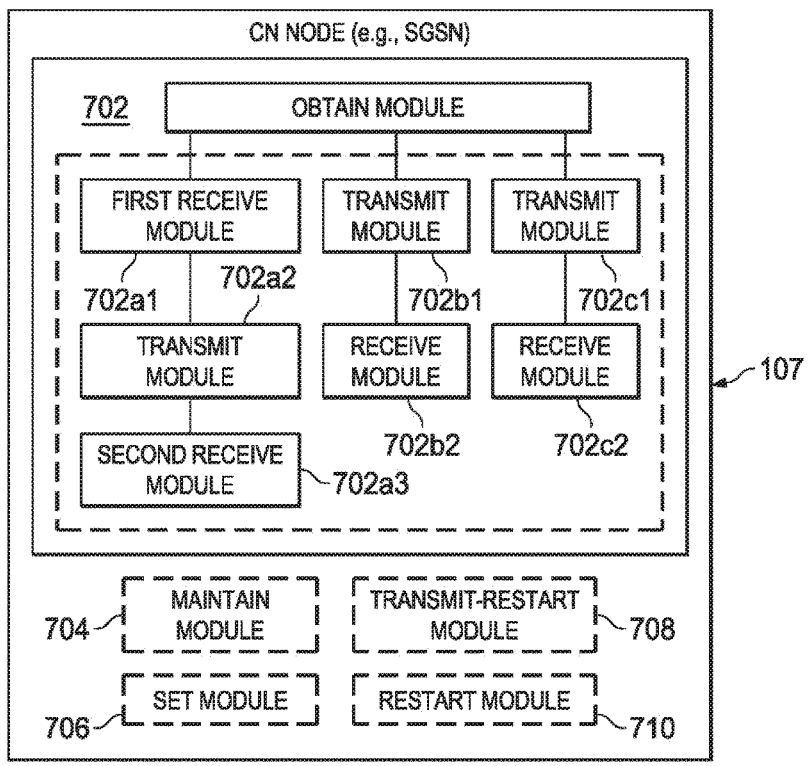
FIG. 7 is a block diagram illustrating a structure of the CN node configured in accordance with an embodiment of the present disclosure.

Referring to FIG. 7, there is a block diagram illustrating structures of an exemplary CN node 107 (e.g., SGSN 107) which interacts with RAN nodes $102_1$ and $102_2$ (BSS $102_1$ and $102_2$) to time coordinate cells $152_1$ and $152_2$ and maintain a reliability of paging a wireless device $104_2$ (for example) in accordance with an embodiment of the present disclosure. In one embodiment, the CN node 107 comprises an obtain module 702, a maintain module 704, a set module 706, a transmit-restart module 708, and a restart module 710. The obtain module 702 is configured to obtain, from one of the RAN nodes $102_1$ or $102_2$, information indicating a time remaining until a next paging opportunity 156 for the wireless device $104_2$ within the cells $152_1$ and $152_2$ comprising a paging area 154 of the wireless device $104_2$. Several examples of how the obtain module 702 can be configured to obtain the time remaining until a next paging opportunity 156 for the wireless device $104_2$ are as follows:

1. The obtain module 702 can obtain from one of the RAN nodes 102₁ or 102₂, the time remaining until a next paging opportunity 156 by: (1) receiving a first BSSGP PDU 204 containing a RAU Request from one RAN node 102₂ (for example), wherein the RAU Request is associated with the wireless device 104₂ (first receive module 702a1); (2) transmitting a second BSSGP PDU 206 containing a RAU Accept to the one RAN node 102₂, wherein the second BSSGP PDU 206 includes TLLI parameters (e.g., IMSI, eDRX cycle length, coverage class (not applicable for uPoD devices)) associated with the wireless device 104₂ (transmit module 702a2); and (3) receiving a third BSSGP PDU 212 containing a RAU Complete from the one RAN node 102₂, wherein the third BSSGP PDU 212 includes the time remaining until a next paging opportunity 156 for the wireless device 104₂ (second receive module 702a3). See also FIG. 2 and its associated text for another discussion about this exemplary way that the obtain module 702 can obtain the time remaining until a next paging opportunity 156 for the wireless device 104₂.

2. The obtain module 702 can obtain from one of the RAN nodes 102₁ or 102₂, the time remaining until a next paging opportunity 156 by: (1) transmitting a paging request 302 to the one RAN node 102₂ (for example), wherein the paging request 302 includes TLLI parameters (e.g., IMSI, eDRX cycle length, coverage class (not applicable for uPoD devices)) associated with the wireless device 104₂ (transmit module 702b1); and (2) receiving a paging response 308 from the one RAN node 102₂, wherein the paging response 308 includes the time remaining until a next paging opportunity 156 for the wireless device 104₂ (receive module 702b2). See also FIG. 3 and its associated text for another discussion about this exemplary way that the obtain module 702 can obtain the time remaining until a next paging opportunity 156 for the wireless device 104₂.

3. The obtain module 702 can obtain from one of the RAN nodes 102₁ or 102₂, the time remaining until a next paging opportunity 156 by: (1) transmitting a dummy paging request 402 to the one RAN node 102₂ (for example), wherein the dummy paging request 402 includes TLLI parameters (e.g., IMSI, eDRX cycle length, coverage class (not applicable for uPoD devices)) associated with the wireless device 104₂ (transmit module 702c1); and (2) receiving a dummy paging response 404 from the one RAN node 102₂, wherein the dummy paging response 404 includes the time remaining until a next paging opportunity 156 for the wireless device 104₂ (receive module 702c2) (note: the dummy paging response 404 corresponds to the dummy paging request 402, i.e., when a given dummy paging response 404 is received it always corresponds to one specific previously transmitted dummy paging request 402). See also FIG. 4 and its associated text for another discussion about this exemplary way that the obtain module 702 can obtain the time remaining until a next paging opportunity 156 for the wireless device 104₂. Recall in this case the RAN node 102₂ does not transmit a paging message over a radio interface to the wireless device 104₂, and the CN node 107 can send the dummy paging request 402 as frequently as it desires to verify its understanding of when the next paging opportunity will occur for a given wireless device 104₂ (for example).

The maintain module 704 is configured to maintain an eDRX cycle timer 158 associated with the wireless device 104₂ by using the obtained time remaining until the next paging opportunity 156 for the wireless device 104₂ and an eDRX cycle length associated with the wireless device 104₂. For example, the maintain module 704 can maintain the eDRX cycle timer 158 by: (1) obtaining updated information indicating the time remaining until the next paging opportunity 156 for the wireless device 104₂ (note: the updated information can be obtained as frequently or infrequently as desired by the maintain module 704); and (2) modifying the eDRX cycle timer 158 based on the obtained updated information indicating the time remaining until the next paging opportunity 156 for the wireless device 104₂. The set module 706 is configured to set the eDRX cycle timer 158 to expire a predetermined time (e.g., few seconds) before the next paging opportunity for the wireless device 104₂. Upon the expiration of the eDRX cycle timer 158 and based on there being a buffered paging message for the wireless device 104₂, the transmit-restart module 708 is configured to transmit a set of paging requests to the RAN nodes 102₁ and 102₂ managing the cells 152₁ and 152₂ comprising the paging area 154 of the wireless device 104₂ and restart the eDRX cycle timer 158 (recall: the CN node 107 will buffer a paging message for the wireless device 104₂ upon receiving a N-PDU for the wireless device 104₂). Upon the expiration of the eDRX cycle timer 158 and based on there being no buffered paging message for the wireless device 104₂, the restart module 710 is configured to restart the eDRX cycle timer 158. Further, it should be noted that the CN node 107 may also include other components, modules or structures which are well-known, but for clarity, only the components, modules or structures needed to describe the features of the present disclosure are described herein.

As those skilled in the art will appreciate, the above-described modules 702, 704, 706, 708, and 710 of the CN node 107 may be implemented separately as suitable dedicated circuits. Further, the modules 702, 704, 706, 708, and 710 can also be implemented using any number of dedicated circuits through functional combination or separation. In some embodiments, the modules 702, 704, 706, 708, and 710 may be even combined in a single application specific integrated circuit (ASIC). As an alternative software-based implementation, the CN node 107 may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 to perform the steps of the above-described method 600.

Figure 8:
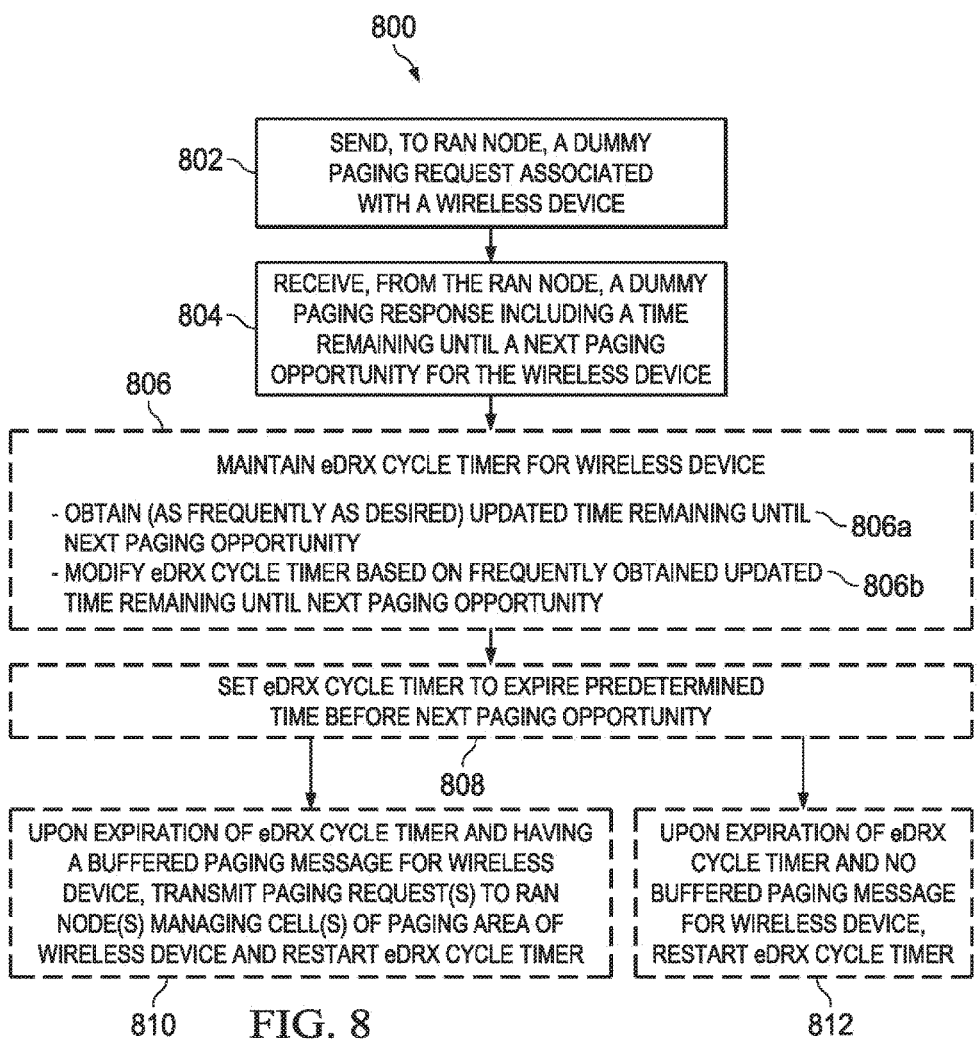
FIG. 8 is a flowchart of another method implemented in the CN node in accordance with an embodiment of the present disclosure.

Referring to FIG. 8, there is a flowchart of a method 800 implemented in the CN node 107 (e.g., SGSN 107) in accordance with an embodiment of the present disclosure. At step 802, the CN node 107 sends, to a RAN node 102₂ (for example), a dummy paging request 402 associated with a wireless device 104₂ (for example). The dummy paging request 402 includes TLLI specific parameters (e.g., IMSI, eDRX cycle length, coverage class (not applicable for uPoD devices)) associated with the wireless device 104₂. Further, the dummy paging request 402 is defined to trigger the RAN node 102₂ (e.g., BSS 102₂) to calculate the time remaining until the next paging opportunity 156 for the wireless device 104₂ within the cells 152₁ and 152₂ comprising a paging area 154 of the wireless device 104₂. In this case, the RAN node 102₂ (e.g., BSS 102₂) upon receiving the dummy paging request 402 does not send a paging message over the radio interface to the wireless device 104₂. At step 804, the CN node 107 receives, from the RAN node 102₂ (e.g., BSS 102₂), a dummy paging response 404 which includes a time remaining until a next paging opportunity 156 for the wireless device 104₂ (note: the dummy paging response 404 corresponds to the dummy paging request 402, i.e., when a given dummy paging response 404 is received it always corresponds to one specific previously transmitted dummy paging request 402). At step 806, the CN node 107 maintains an eDRX cycle timer 158 associated with the wireless device 104₂ by using the obtained time remaining until the next paging opportunity 156 for the wireless device 104₂ and an eDRX cycle length associated with the wireless device 104₂. For example, the CN node 107 can maintain the eDRX cycle timer 158 by: (1) sending a dummy paging request to the RAN node 102₂ (e.g., BSS 102₂) as frequently or infrequently as desired to obtain updated time remaining until the next paging opportunity 156 for the wireless device 104₂ (step 806a); and (2) modifying the eDRX cycle timer 158 based on the obtained updated information indicating the time remaining until the next paging opportunity 156 for the wireless device 104₂ (step 806b). At step 808, the CN node 107 sets the eDRX cycle timer 158 to expire a predetermined time (e.g., few seconds) before the next paging opportunity for the wireless device 104₂. Upon the expiration of the eDRX cycle timer 158 and based on there being a buffered paging message for the wireless device 104₂, the CN node 107 at step 810 transmits a set of paging requests to the RAN nodes 102₁ and 102₂ which are managing the cells 152₁ and 152₂ comprising the paging area 154 of the wireless device 104₂ and restarts the eDRX cycle timer 158 (recall: the CN node 107 will buffer a paging message for the wireless device 104₂ upon receiving a N-PDU for the wireless device 104₂). Upon the expiration of the eDRX cycle timer 158 and based on there being no buffered paging message for the wireless device 104₂, the CN node 107 at step 812 restarts the eDRX cycle timer 158.

Figure 9:
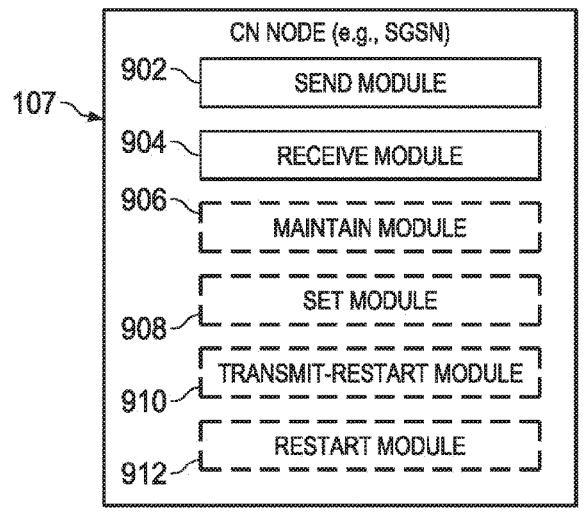
FIG. 9 is a block diagram illustrating another structure of the CN node configured in accordance with an embodiment of the present disclosure.

Referring to FIG. 9, there is a block diagram illustrating structures of an exemplary CN node 107 (e.g., SGSN 107) configured in accordance with an embodiment of the present disclosure. In one embodiment, the CN node 107 comprises a send module 902, a receive module 904, a maintain module 906, a set module 908, a transmit-restart module 910, and a restart module 912. The send module 902 is configured to send, to a RAN node 102₂ (for example), a dummy paging request 402 associated with a wireless device 104₂ (for example). The dummy paging request 402 can include TLLI specific parameters (e.g., IMSI, eDRX cycle length, coverage class (not applicable for uPoD devices)) associated with the wireless device 104₂. Further, the dummy paging request 402 is defined to trigger the RAN node 102₂ (e.g., BSS 102₂) to calculate the time remaining until the next paging opportunity 156 for the wireless device 104₂ within the cells 152₁ and 152₂ comprising a paging area 154 of the wireless device 104₂. In this case, the RAN node 102₂ (e.g., BSS 102₂) upon receiving the dummy paging request 402 does not send a paging message over the radio interface to the wireless device 104₂. The receive module 904 is configured to receive, from the RAN node 102₂ (e.g., BSS 102₂), a dummy paging response 404 which includes a time remaining until a next paging opportunity 156 for the wireless device 104₂ (note: the dummy paging response 404 corresponds to the dummy paging request 402, i.e., when a given dummy paging response 404 is received it always corresponds to one specific previously transmitted dummy paging request 402). The maintain module 906 is configured to maintain an eDRX cycle timer 158 associated with the wireless device 104₂ by using the obtained time remaining until the next paging opportunity 156 for the wireless device 104₂ and an eDRX cycle length associated with the wireless device 104₂. For example, the maintain module 906 can maintain the eDRX cycle timer 158 by: (1) sending a dummy paging request 402 to the RAN node 102₂ (e.g., BSS 102₂) as frequently or infrequently as desired to obtain updated time remaining until the next paging opportunity 156 for the wireless device 104₂; and (2) modifying the eDRX cycle timer 158 based on the obtained updated information indicating the time remaining until the next paging opportunity 156 for the wireless device 104₂. The set module 908 is configured to set the eDRX cycle timer 158 to expire a predetermined time (e.g., few seconds) before the next paging opportunity for the wireless device 104₂. Upon the expiration of the eDRX cycle timer 158 and based on there being a buffered paging message for the wireless device 104₂, the transmit-restart module 910 is configured to transmit a set of paging requests to the RAN nodes 102₁ and 102₂ which are managing the cells 152₁ and 152₂ comprising the paging area 154 of the wireless device 104₂ and restart the eDRX cycle timer 158 (recall: the CN node 107 will buffer a paging message for the wireless device 104₂ upon receiving a N-PDU for the wireless device 104₂). Upon the expiration of the eDRX cycle timer 158 and based on there being no buffered paging message for the wireless device 104₂, the restart module 912 is configured to restart the eDRX cycle timer 158. Further, it should be noted that the CN node 107 may also include other components, modules or structures which are well-known, but for clarity, only the components, modules or structures needed to describe the features of the present disclosure are described herein.

As those skilled in the art will appreciate, the above-described modules 902, 904, 906, 908, 910, and 912 of the CN node 107 may be implemented separately as suitable dedicated circuits. Further, the modules 902, 904, 906, 908, 910, and 912 can also be implemented using any number of dedicated circuits through functional combination or separation. In some embodiments, the modules 902, 904, 906, 908, 910, and 912 may be even combined in a single application specific integrated circuit (ASIC). As an alternative software-based implementation, the CN node 107 may comprise a memory 148, a processor 146 (including but not limited to a microprocessor, a microcontroller or a Digital Signal Processor (DSP), etc.) and a transceiver 136. The memory 148 stores machine-readable program code executable by the processor 146 to cause the CN node 107 to perform the steps of the above-described method 800.

Figure 10:
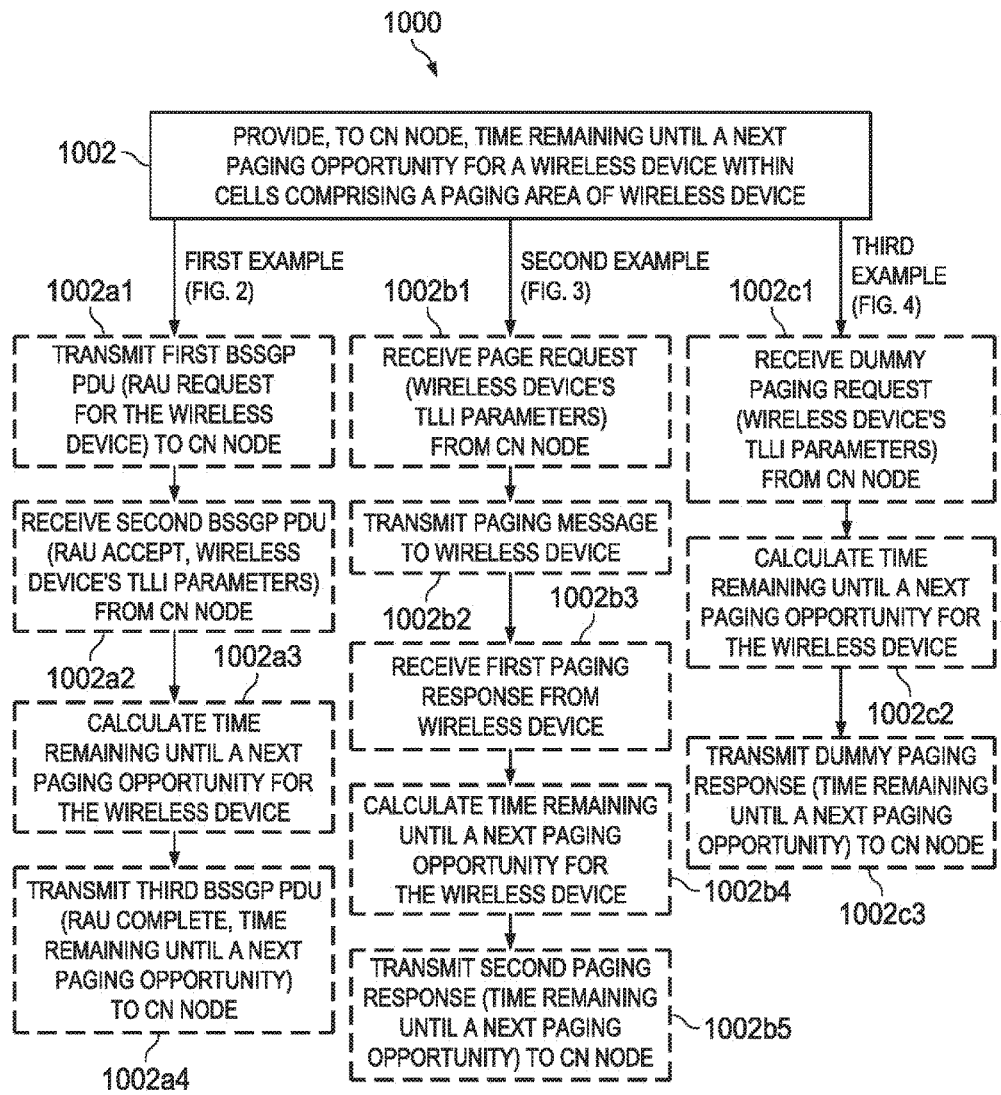
FIG. 10 is a flowchart of a method implemented in the RAN node in accordance with an embodiment of the present disclosure.

Referring to FIG. 10, there is a flowchart of a method 1000 implemented in the RAN node 102₂ (BSS 102₂) which interacts with the CN node 107 (e.g., SGSN 107) to time coordinate cells 152₁ and 152₂ and maintain a reliability of paging a wireless device 104₂ (for example) in accordance with an embodiment of the present disclosure. At step 1002, the RAN node 102₂ provides, to the CN node 107, information indicating a time remaining until a next paging opportunity 156 for the wireless device 104₂ within the cells 152₁ and 152₂ comprising a paging area 154 of the wireless device 104₂. Several examples of how the RAN node 102₂ can provide the time remaining until a next paging opportunity 156 for the wireless device 104₂ are as follows:

1. The RAN node 102₂ can per step 1002 provide the CN node 107 with the time remaining until a next paging opportunity 156 by: (1) transmitting a first BSSGP PDU 204 containing a RAU Request to the CN node 107, wherein the RAU Request is associated with the wireless device 104₂ (step 1002a1); (2) receiving a second BSSGP PDU 206 containing a RAU Accept from the CN node 107, wherein the second BSSGP PDU 206 includes TLLI parameters (e.g., IMSI, eDRX cycle length, coverage class (not applicable for uPoD devices)) associated with the wireless device 104₂ (step 1002a2); (3) calculating the time remaining until a next paging opportunity 156 for the wireless device 104₂ using at least the TLLI parameters (e.g., IMSI, eDRX cycle length, coverage class (not applicable for uPoD devices)) associated with the wireless device 104$_2$ (step 1002a3) (e.g., see description associated with TABLE 1 and FIG. 5); and (4) transmitting a third BSSGP PDU 212 containing a RAU Complete to the CN node 107, wherein the third BSSGP PDU 212 includes the time remaining until a next paging opportunity 156 for the wireless device 104$_2$ (step 1002a4). See also FIG. 2 and its associated text for another discussion about this exemplary way that the RAN node 102$_2$ can provide the CN node 107 with the time remaining until a next paging opportunity 156 for the wireless device 104$_2$.

2. The RAN node 102$_2$ can per step 1002 provide the CN node 107 with the time remaining until a next paging opportunity 156 by: (1) receiving a paging request 302 from the CN node 107, wherein the paging request 302 includes TLLI parameters (e.g., IMSI, eDRX cycle length, coverage class (not applicable for uPoD devices)) associated with the wireless device 104$_2$ (step 1002b1); (2) transmitting a paging message 304 to the wireless device 104$_2$ (step 1002b2); (3) receiving a first paging response 306 from the wireless device 104$_2$ (step 1002b3); (4) calculating the time remaining until a next paging opportunity 156 for the wireless device 104$_2$ using at least the TLLI parameters (e.g., IMSI, eDRX cycle length, coverage class (not applicable for uPoD devices)) associated with the wireless device 104$_2$ (step 1002b4) (e.g., see description associated with TABLE 1 and FIG. 5); and (5) transmitting a second paging response 308 to the CN node 107, wherein the second paging response 308 includes the time remaining until a next paging opportunity 156 for the wireless device 104$_2$ (step 1002b5). See also FIG. 3 and its associated text for another discussion about this exemplary way that the RAN node 102$_2$ can provide the CN node 107 with the time remaining until a next paging opportunity 156 for the wireless device 104$_2$.

3. The RAN node 102$_2$ can per step 1002 provide the CN node 107 with the time remaining until a next paging opportunity 156 by: (1) receiving a dummy paging request 402 from the CN node 107, wherein the dummy paging request 402 includes TLLI parameters (e.g., IMSI, eDRX cycle length, coverage class (not applicable for uPoD devices)) associated with the wireless device 104$_2$ (step 1002c1); (2) upon receiving the dummy paging request 402 do not transmit a paging message over the radio interface to the wireless device 104$_2$ but instead calculate the time remaining until a next paging opportunity 156 for the wireless device 104$_2$ using at least the TLLI parameters (e.g., IMSI, eDRX cycle length, coverage class (not applicable for uPoD devices)) associated with the wireless device 104$_2$ (step 1002c2) (e.g., see description associated with TABLE 1 and FIG. 5); and (3) transmitting a dummy paging response 404 to the CN node 107, wherein the dummy paging response includes the time remaining until a next paging opportunity 156 for the wireless device 104$_2$ (step 1002c3) (note: the dummy paging response 404 corresponds to the dummy paging request 402, i.e., when a given dummy paging response 404 is received it always corresponds to one specific previously transmitted dummy paging request 402). See also FIG. 4 and its associated text for another discussion about this exemplary way that the RAN node 102$_2$ can provide the CN node 107 with the time remaining until a next paging opportunity 156 for the wireless device 104$_2$. Recall in this case the CN node 107 can send the dummy paging request 402 as frequently as it desires to verify its understanding of when the next paging opportunity will occur for a given wireless device 104$_2$ (for example).

Figure 11:
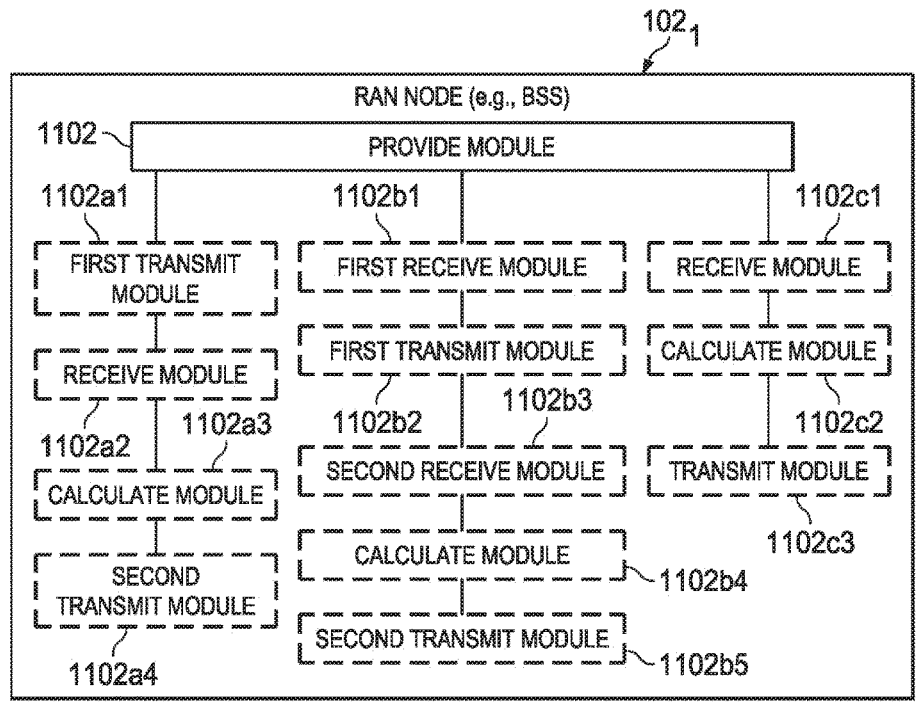
FIG. 11 is a block diagram illustrating a structure of the RAN node configured in accordance with an embodiment of the present disclosure.

Referring to FIG. 11, there is a block diagram illustrating structures of an exemplary RAN node 102$_2$ (for example) configured to interact with the CN node 107 (e.g., SGSN 107) to time coordinate cells 152$_1$ and 152$_2$ and maintain a reliability of paging a wireless device 104$_2$ (for example) in accordance with an embodiment of the present disclosure. In one embodiment, the RAN node 102$_2$ comprises a provide module 1102. The provide module 1102 is configured to provide, to the CN node 107, information indicating a time remaining until a next paging opportunity 156 for the wireless device 104$_2$ within the cells 152$_1$ and 152$_2$ comprising a paging area 154 of the wireless device 104$_2$. Several examples of how the provide module 1102 can provide the time remaining until a next paging opportunity 156 for the wireless device 104$_2$ are as follows:

1. The provide module 1102 can be configured to provide the CN node 107 with the time remaining until a next paging opportunity 156 by: (1) transmitting a first BSSGP PDU 204 containing a RAU Request to the CN node 107, wherein the RAU Request is associated with the wireless device 104$_2$ (first transmit module 1102a1); (2) receiving a second BSSGP PDU 206 containing a RAU Accept from the CN node 107, wherein the second BSSGP PDU 206 includes TLLI parameters (e.g., IMSI, eDRX cycle length, coverage class (not applicable for uPoD devices)) associated with the wireless device 104$_2$ (receive module 1102a2); (3) calculating the time remaining until a next paging opportunity 156 for the wireless device 104$_2$ using at least the TLLI parameters (e.g., IMSI, eDRX cycle length, coverage class (not applicable for uPoD devices)) associated with the wireless device 104$_2$ (calculate module 1102a3) (e.g., see description associated with TABLE 1 and FIG. 5); and (4) transmitting a third BSSGP PDU 212 containing a RAU Complete to the CN node 107, wherein the third BSSGP PDU 212 includes the time remaining until a next paging opportunity 156 for the wireless device 104$_2$ (second transmit module 1102a4). See also FIG. 2 and its associated text for another discussion about this exemplary way that the RAN node 102$_2$ can provide the CN node 107 with the time remaining until a next paging opportunity 156 for the wireless device 104$_2$.

2. The provide module 1102 can be configured to provide the CN node 107 with the time remaining until a next paging opportunity 156 by: (1) receiving a paging request 302 from the CN node 107, wherein the paging request 302 includes TLLI parameters (e.g., IMSI, eDRX cycle length, coverage class (not applicable for uPoD devices)) associated with the wireless device 104$_2$ (first receive module 1102b1); (2) transmitting a paging message 304 to the wireless device 104$_2$ (first transmit module 1002b2); (3) receiving a first paging response 306 from the wireless device 104$_2$ (second receive module 1102b3); (4) calculating the time remaining until a next paging opportunity 156 for the wireless device 104$_2$ using at least the TLLI parameters (e.g., IMSI, eDRX cycle length, coverage class (not applicable for uPoD devices)) associated with the wireless device 104$_2$ (calculate module 1102b4) (e.g., see description associated with TABLE 1 and FIG. 5); and (5) transmitting a second paging response 308 to the CN node 107, wherein the second paging response 308 includes the time remaining until a next paging opportunity 156 for the wireless device 104$_2$ (second transmit module 1102b5). See also FIG. 3 and its associated text for another discussion about this exemplary way that the RAN node 102$_2$ can provide the CN node 107 with the time remaining until a next paging opportunity 156 for the wireless device 104$_2$.

3. The provide module 1102 can be configured to provide the CN node 107 with the time remaining until a next paging opportunity 156 by: (1) receiving a dummy paging request 402 from the CN node 107, wherein the dummy paging request 402 includes TLLI parameters (e.g., IMSI, eDRX cycle length, coverage class (not applicable for uPoD devices)) associated with the wireless device 104$_2$ (receive module 1102c1); (2) upon receiving the dummy paging request 402 do not transmit a paging message over the radio interface to the wireless device 104$_2$ but instead calculate the time remaining until a next paging opportunity 156 for the wireless device 104$_2$ using at least the TLLI parameters (e.g., IMSI, eDRX cycle length, coverage class (not applicable for uPoD devices)) associated with the wireless device 104$_2$ (calculate module 1102c2) (e.g., see description associated with TABLE 1 and FIG. 5); and (3) transmitting a dummy paging response 404 to the CN node 107, wherein the dummy paging response 404 includes the time remaining until a next paging opportunity 156 for the wireless device 104$_2$ (transmit module 1102c3) (note: the dummy paging response 404 corresponds to the dummy paging request 402, i.e., when a given dummy paging response 404 is received it always corresponds to one specific previously transmitted dummy paging request 402). See also FIG. 4 and its associated text for another discussion about this exemplary way that the RAN node 102$_2$ can provide the CN node 107 with the time remaining until a next paging opportunity 156 for the wireless device 104$_2$. Recall in this case the CN node 107 can send the dummy paging request 402 as frequently as it desires to verify its understanding of when the next paging opportunity will occur for a given wireless device 104$_2$ (for example). It should be noted that the RAN node 102$_2$ may also include other components, modules or structures which are well-known, but for clarity, only the components, modules or structures needed to describe the features of the present disclosure are described herein. The other RAN node 102$_1$ can also be configured in a similar manner with the illustrated structure of the RAN node 102$_2$.

As those skilled in the art will appreciate, the above-described module 1102 of the RAN node 102$_2$ (e.g., BSS 102$_2$, NodeB 102$_2$, eNodeB 102$_2$) may be implemented by suitable dedicated circuit(s). Further, the module 1102 can also be implemented using any number of dedicated circuits through functional combination or separation. In some embodiments, the module 1102 may be even combined in a single application specific integrated circuit (ASIC). As an alternative software-based implementation, the RAN node 102$_2$ may comprise a memory 134$_2$, a processor 132$_2$ (including but not limited to a microprocessor, a microcontroller or a Digital Signal Processor (DSP), etc.) and a transceiver 122$_2$. The memory 134$_2$ stores machine-readable program code executable by the processor 132$_2$ to cause the RAN node 102$_2$ (e.g., BSS 102$_2$, NodeB 102$_2$, eNodeB 102$_2$) to perform the steps of the above-described method 1000. It should be appreciated that the other RAN nodes 102$_1$ (for example) can also be configured in a similar manner as the RAN node 102$_2$ to perform method 1000.

Figures 12, 13:
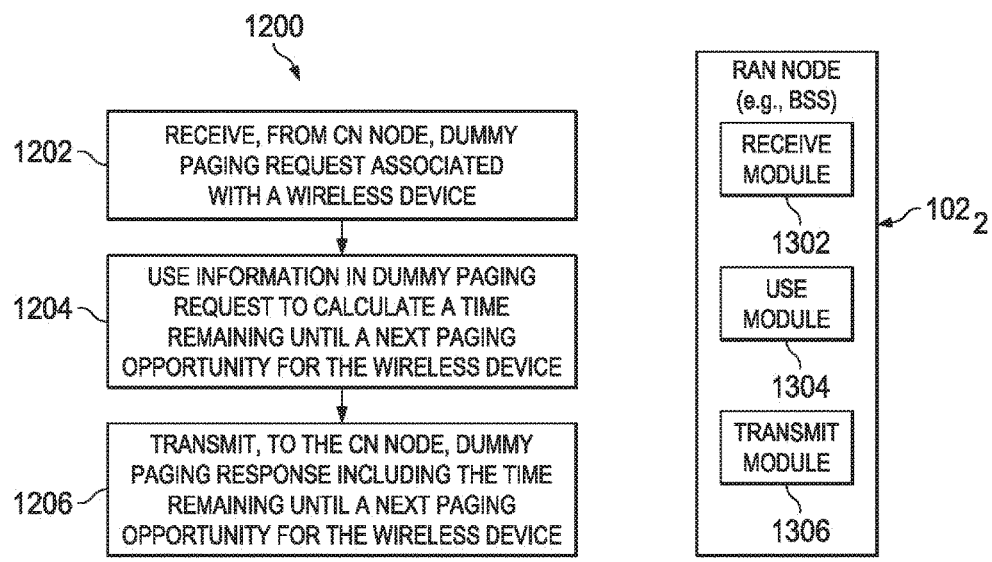
FIG. 12 is a flowchart of another method implemented in the RAN node in accordance with an embodiment of the present disclosure.
FIG. 13 is a block diagram illustrating another structure of the RAN node configured in accordance with an embodiment of the present disclosure.

Referring to FIG. 12, there is a flowchart of a method 1200 implemented in the RAN node 102$_2$ (BSS 102$_2$) in accordance with an embodiment of the present disclosure. At step 1202, the RAN node 102$_2$ receives, from the CN node 107, a dummy paging request 402 associated with a wireless device 104$_2$ (for example). The dummy paging request 402 can include TLLI parameters (e.g., IMSI, eDRX cycle length, coverage class (not applicable for uPoD devices)) associated with the wireless device 104$_2$. At step 1204, the RAN node 102$_2$ uses information (e.g., TLLI parameters) provided within the dummy paging request 402 to calculate the time remaining until a next paging opportunity 156 for the wireless device 104$_2$ (e.g., see description associated with TABLE 1 and FIG. 5). The RAN node 102$_2$ upon receiving the dummy paging request 402 does not transmit a paging message over the radio interface to the wireless device 104$_2$ but instead calculates the time remaining until a next paging opportunity 156 for the wireless device 104$_2$ using at least the TLLI parameters (e.g., IMSI, eDRX cycle length, coverage class (not applicable for uPoD devices)) associated with the wireless device 104$_2$. At step 1206, the RAN node 102$_2$ transmits a dummy paging response 404 to the CN node 107, wherein the dummy paging response 404 includes the time remaining until a next paging opportunity 156 for the wireless device 104$_2$ (note: the dummy paging response 404 corresponds to the dummy paging request 402, i.e., when a given dummy paging response 404 is received it always corresponds to one specific previously transmitted dummy paging request 402). See also FIG. 4 and its associated text for another discussion about this exemplary way that the RAN node 102$_2$ can provide the CN node 107 with the time remaining until a next paging opportunity 156 for the wireless device 104$_2$. Recall in this case the CN node 107 can send the dummy paging request 402 as frequently as it desires to verify its understanding of when the next paging opportunity will occur for a given wireless device 104$_2$ (for example).

Referring to FIG. 13, there is a block diagram illustrating structures of an exemplary RAN node 102$_2$ (for example) configured in accordance with an embodiment of the present disclosure. In one embodiment, the RAN node 102$_2$ comprises a receive module 1302, a use module 1304, and a transmit module 1306. The receive module 1302 is configured to receive, from the CN node 107, a dummy paging request 402 associated with a wireless device 104$_2$ (for example). The dummy paging request 402 can include TLLI parameters (e.g., IMSI, eDRX cycle length, coverage class (not applicable for uPoD devices)) associated with the wireless device 104$_2$. The use module 1304 is configured to use information (e.g., TLLI parameters) provided within the dummy paging request 402 to calculate the time remaining until a next paging opportunity 156 for the wireless device 104$_2$ (e.g., see description associated with TABLE 1 and FIG. 5). The use module 1304 upon receiving the dummy paging request 402 does not transmit a paging message over the radio interface to the wireless device 104$_2$ but instead calculates the time remaining until a next paging opportunity 156 for the wireless device 104$_2$ using at least the TLLI parameters (e.g., IMSI, eDRX cycle length, coverage class (not applicable for uPoD devices)) associated with the wireless device 104$_2$. The transmit module 1306 is configured to transmit a dummy paging response 404 to the CN node 107, wherein the dummy paging response 404 includes the time remaining until a next paging opportunity 156 for the wireless device 104$_2$ (note: the dummy paging response 404 corresponds to the dummy paging request 402, i.e., when a given dummy paging response 404 is received it always corresponds to one specific previously transmitted dummy paging request 402). It should be noted that the RAN node 102$_2$ may also include other components, modules or structures which are well-known, but for clarity, only the components, modules or structures needed to describe the features of the present disclosure are described herein. The other RAN node 102$_1$ can also be configured in a similar manner with the illustrated structure of the RAN node 102$_2$.

As those skilled in the art will appreciate, the above-described modules 1302, 1304, and 1306 of the RAN node 102$_2$ (e.g., BSS 102$_2$, NodeB 102$_2$, eNodeB 102$_2$) may be implemented by suitable dedicated circuits. Further, the modules 1302, 1304, and 1306 can also be implemented using any number of dedicated circuits through functional combination or separation. In some embodiments, the modules 1302, 1304, and 1306 may be even combined in a single application specific integrated circuit (ASIC). As an alternative software-based implementation, the RAN node $102_2$ may comprise a memory $134_2$, a processor $132_2$ (including but not limited to a microprocessor, a microcontroller or a Digital Signal Processor (DSP), etc.) and a transceiver $122_2$. The memory $134_2$ stores machine-readable program code executable by the processor $132_2$ to cause the RAN node $102_2$ (e.g., BSS $102_2$, NodeB $102_2$, eNodeB $102_2$) to perform the steps of the above-described method 1200. It should be appreciated that the other RAN nodes $102_1$ (for example) can also be configured in a similar manner as the RAN node $102_2$ to perform method 1200.

In view of the foregoing, one skilled in the art will appreciate that the present disclosure discloses a CN node 107 (e.g., SGSN 107), RAN nodes $102_1$ and $102_2$ (e.g., BSS $102_1$ and $102_2$), and various methods 600, 800, 1000 and 1200 that address the drawbacks of the state-of-the-art by realizing time coordinated cells $152_1$ and $152_2$ and maintaining a reliability of paging a wireless device $104_2$ (e.g., MTC device $104_2$, mobile station $104_2$). The present disclosure has several advantages some of which are as follows: the techniques of realizing time coordinated cells described herein allows for maintaining a reliability of paging for wireless devices using eDRX cycle lengths that is equivalent to that associated with wireless devices using legacy DXR cycle lengths. In addition, the techniques of providing a CN node (e.g., SGSN) with information about "time remaining until the next paging opportunity" for wireless devices described herein may be seen as relatively less complex and inexpensive compared to solutions that rely on (a) the CN node (e.g., SGSN) needing to know about the radio interface related frame structures used to determine exact paging occasions, or (b) the wireless devices being equipped with GPS receivers for conveying precise time of day information to the CN node (e.g., SGSN).

The techniques described herein are applicable to any Radio Access Technology (RAT), wherein the controlling core network node (e.g., SGSN, Mobility Management Entity (MME), or similar) needs to know when the paging opportunity occurs on the radio interface, wherein the RAN (e.g., Base Station System (BSS), Node B (Nb), evolved Nb (eNb), or similar), during active data transfer, provides the controlling core network nodes with timing information of the radio interface, and/or wherein the information to calculate the radio interface timing is provided by the controlling core network node. It is further to be noted that the information needed to determine the radio interface timing may vary from system to system, and thus, may be solution dependent.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A core network (CN) node configured to interact with a plurality of radio access network (RAN) nodes to time coordinate a plurality of cells and maintain a reliability of paging a wireless device, the CN node comprising:
   a processor; and,
   a memory that stores processor-executable instructions, wherein the processor interfaces with the memory to execute the processor-executable instructions, whereby the CN node is operable to:
      transmit a paging request to one of the RAN nodes, wherein the paging request includes information associated with the wireless device, the information for using by the one RAN node to calculate a time remaining until a next paging opportunity for the wireless device within the cells comprising a paging area of the wireless device, and wherein the information comprises an International Mobile Subscriber Identity (IMSI) of the wireless device, an extended Discontinuous Receive (eDRX) cycle length of the wireless device, and a coverage class of the wireless device; and,
      receive a paging response from the one RAN node, wherein the paging response includes the time remaining until a next paging opportunity for the wireless device.

2. The CN node of claim 1, wherein:
   the paging request is a dummy paging request; and,
   the paging response is a dummy paging response, wherein the dummy paging request is defined to trigger the one RAN node to calculate the time remaining until the next paging opportunity for the wireless device and then transmit the dummy paging request which includes the time remaining until the next paging opportunity for the wireless device without the one RAN node transmitting a paging message over a radio interface to the wireless device.

3. The CN node of claim 1, wherein the CN node is further operable to:
   maintain an extended Discontinuous Receive (eDRX) cycle timer associated with the wireless device by using the obtained time remaining until the next paging opportunity for the wireless device and an eDRX cycle length associated with the wireless device.

4. The CN node of claim 3, wherein the CN node is further operable to perform the maintain operation as follows:
obtaining updated information indicating the time remaining until the next paging opportunity for the wireless device; and
modifying the eDRX cycle timer based on the obtained updated information indicating the time remaining until the next paging opportunity for the wireless device.

5. The CN node of claim 3, wherein the CN node is further operable to:
set the eDRX cycle timer to expire a predetermined time before the next paging opportunity for the wireless device;
upon the expiration of the eDRX cycle timer and based on there being a buffered paging message for the wireless device, transmit one or more paging requests to the one or more RAN nodes managing the cells comprising the paging area of the wireless device and restart the eDRX cycle timer; and,
upon the expiration of the eDRX cycle timer and based on there being no buffered paging message for the wireless device, restart the eDRX cycle timer.

6. A method in a core network (CN) node configured to interact with a plurality of radio access network (RAN) nodes for time coordinating a plurality of cells and maintaining a reliability of paging a wireless device, the method comprising:
transmitting a paging request to one of the RAN nodes, wherein the paging request includes information associated with the wireless device, the information for using by the one RAN node to calculate a time remaining until a next paging opportunity for the wireless device within the cells comprising a paging area of the wireless device, and wherein the information comprises an International Mobile Subscriber Identity (IMSI) of the wireless device, an extended Discontinuous Receive (eDRX) cycle length of the wireless device, and a coverage class of the wireless device; and,
receiving a paging response from the one RAN node, wherein the paging response includes the time remaining until a next paging opportunity for the wireless device.

7. The method of claim 6, wherein:
the paging request is a dummy paging request; and,
the paging response is a dummy paging response, wherein the dummy paging request is defined to trigger the one RAN node to calculate the time remaining until the next paging opportunity for the wireless device and then transmit the dummy paging request which includes the time remaining until the next paging opportunity for the wireless device without the one RAN node transmitting a paging message over a radio interface to the wireless device.

8. The method of claim 6, further comprising:
maintaining an extended Discontinuous Receive (eDRX) cycle timer associated with the wireless device by using the obtained time remaining until the next paging opportunity for the wireless device and an eDRX cycle length associated with the wireless device.

9. The method of claim 8, wherein the maintaining step further comprises:
obtaining updated information indicating the time remaining until the next paging opportunity for the wireless device; and
modifying the eDRX cycle timer based on the obtained updated information indicating the time remaining until the next paging opportunity for the wireless device.

10. The method of claim 8, further comprising:
setting the eDRX cycle timer to expire a predetermined time before the next paging opportunity for the wireless device;
upon the expiration of the eDRX cycle timer and based on there being a buffered paging message for the wireless device, transmitting one or more paging requests to the one or more RAN nodes managing the cells comprising the paging area of the wireless device and restarting the eDRX cycle timer; and,
upon the expiration of the eDRX cycle timer and based on there being no buffered paging message for the wireless device, restarting the eDRX cycle timer.

11. A core network (CN) node, comprising:
a processor; and,
a memory that stores processor-executable instructions, wherein the processor interfaces with the memory to execute the processor-executable instructions, whereby the CN node is operable to:
send, to a radio access network (RAN) node, a dummy paging request associated with a wireless device, wherein the dummy paging request includes information for using by the RAN node to calculate a time remaining until a next paging opportunity for the wireless device, and wherein the information comprises an International Mobile Subscriber Identity (IMSI) of the wireless device, an extended Discontinuous Receive (eDRX) cycle length of the wireless device, and a coverage class of the wireless device; and,
receive, from the RAN node, a dummy paging response which includes the time remaining until a next paging opportunity for the wireless device.

12. The CN node of claim 11, wherein the CN node is further operable to send the dummy paging request as frequently or infrequently as desired to determine the time remaining until the next paging opportunity for the wireless device.

13. The CN node of claim 11, wherein:
the CN node is a Serving General Packet Radio Service (GPRS) Support Node (SGSN); and,
the RAN node is a Base Station Subsystem (BSS).

14. A method in a core network (CN) node for time coordinating a plurality of cells and maintaining a reliability of paging a wireless device, the method comprising:
sending, to a radio access network (RAN) node, a dummy paging request associated with the wireless device, wherein the dummy paging request includes information for using by the RAN node to calculate a time remaining until a next paging opportunity for the wireless device, and wherein the information comprises an International Mobile Subscriber Identity (IMSI) of the wireless device, an extended Discontinuous Receive (eDRX) cycle length of the wireless device, and a coverage class of the wireless device; and,
receiving, from the RAN node, a dummy paging response which includes the time remaining until a next paging opportunity for the wireless device.

15. The method of claim 14, further comprising sending the dummy paging request as frequently or infrequently as desired to determine the time remaining until the next paging opportunity for the wireless device.

16. The method of claim 14, wherein:
the CN node is a Serving General Packet Radio Service (GPRS) Support Node (SGSN); and,
the RAN node is a Base Station Subsystem (BSS).

17. A core network (CN) node configured to interact with a plurality of radio access network (RAN) nodes to time coordinate a plurality of cells and maintain a reliability of paging a wireless device, the CN node comprising:
a processor; and,
a memory that stores processor-executable instructions, wherein the processor interfaces with the memory to execute the processor-executable instructions, whereby the CN node is operable to:
obtain, from one of the RAN nodes, information indicating a time remaining until a next paging opportunity for the wireless device within the cells comprising a paging area of the wireless device;
maintain an extended Discontinuous Receive (eDRX) cycle timer associated with the wireless device by using the obtained time remaining until the next paging opportunity for the wireless device and an eDRX cycle length associated with the wireless device;
set the eDRX cycle timer to expire a predetermined time before the next paging opportunity for the wireless device;
upon the expiration of the eDRX cycle timer and based on there being a buffered paging message for the wireless device, transmit one or more paging requests to the one or more RAN nodes managing the cells comprising the paging area of the wireless device and restart the eDRX cycle timer; and,
upon the expiration of the eDRX cycle timer and based on there being no buffered paging message for the wireless device, restart the eDRX cycle timer.

18. A method in a core network (CN) node configured to interact with a plurality of radio access network (RAN) nodes for time coordinating a plurality of cells and maintaining a reliability of paging a wireless device, the method comprising:
obtaining, from one of the RAN nodes, information indicating a time remaining until a next paging opportunity for the wireless device within the cells comprising a paging area of the wireless device;
maintaining an extended Discontinuous Receive (eDRX) cycle timer associated with the wireless device by using the obtained time remaining until the next paging opportunity for the wireless device and an eDRX cycle length associated with the wireless device;
setting the eDRX cycle timer to expire a predetermined time before the next paging opportunity for the wireless device;
upon the expiration of the eDRX cycle timer and based on there being a buffered paging message for the wireless device, transmitting one or more paging requests to the one or more RAN nodes managing the cells comprising the paging area of the wireless device and restarting the eDRX cycle timer; and,
upon the expiration of the eDRX cycle timer and based on there being no buffered paging message for the wireless device, restarting the eDRX cycle timer.

* * * * *